(12) United States Patent
Shindo et al.

(10) Patent No.: US 10,141,762 B2
(45) Date of Patent: Nov. 27, 2018

(54) ALL-SOLID-STATE BATTERY SYSTEM

(71) Applicant: Toyota Jidosha Kabushiki Kaisha, Toyota-shi Aichi-ken (JP)

(72) Inventors: Yohei Shindo, Susono (JP); Manabu Imano, Susono (JP); Mayuko Osaki, Susono (JP); Taishi Shiotsuki, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 78 days.

(21) Appl. No.: 15/363,481

(22) Filed: Nov. 29, 2016

(65) Prior Publication Data

US 2017/0155127 A1    Jun. 1, 2017

(30) Foreign Application Priority Data

Nov. 30, 2015    (JP) .................................. 2015-234227

(51) Int. Cl.
| | |
|---|---|
| *H02J 7/00* | (2006.01) |
| *H01M 10/0525* | (2010.01) |
| *H01M 10/44* | (2006.01) |
| *H01M 10/42* | (2006.01) |
| *H01M 4/58* | (2010.01) |

(Continued)

(52) U.S. Cl.
CPC ......... *H02J 7/0068* (2013.01); *H01M 4/5825* (2013.01); *H01M 10/0525* (2013.01); *H01M 10/0562* (2013.01); *H01M 10/425* (2013.01); *H01M 10/44* (2013.01); *H01M 4/485* (2013.01); *H01M 2010/4292* (2013.01)

(58) Field of Classification Search
CPC ...................................................... H02J 7/0068
USPC ......................................................... 320/130
See application file for complete search history.

(56) References Cited

U.S. PATENT DOCUMENTS

| | | | |
|---|---|---|---|
| 9,601,228 B2* | 3/2017 | Deng | ..................... H01B 1/122 |
| 2012/0295155 A1* | 11/2012 | Deng | ..................... H01B 1/122 |
| | | | 429/200 |
| 2015/0228966 A1 | 8/2015 | Kintaka | |

(Continued)

FOREIGN PATENT DOCUMENTS

| | | |
|---|---|---|
| JP | 2007172986 A | 7/2007 |
| JP | 2011192499 A | 9/2011 |

(Continued)

*Primary Examiner* — Suchin Parihar
(74) *Attorney, Agent, or Firm* — Dinsmore & Shohl LLP

(57) ABSTRACT

The all-solid-state battery system that has an all-solid-state battery, the all-solid-state battery having a positive electrode active material layer, a solid electrolyte layer and a negative electrode active material layer, and a control device that controls the lower limit discharge potential of the positive electrode active material layer of the all-solid-state battery. The positive electrode active material layer and/or the solid electrolyte layer have a sulfide solid electrolyte. In addition, the positive electrode active material layer has an olivine-type positive electrode active material. In addition, the capacity of the negative electrode active material layer is lower than the capacity of the positive electrode active material layer. In addition, the control device controls the lower limit discharge potential of the positive electrode active material layer during normal use of the all-solid-state battery to within the range of 1.6 V vs. Li/Li$^+$ to 2.1 V vs. Li/Li$^+$.

7 Claims, 22 Drawing Sheets

(51) Int. Cl.
*H01M 10/0562* (2010.01)
*H01M 4/485* (2010.01)

(56) References Cited

U.S. PATENT DOCUMENTS

| | | |
|---|---|---|
| 2015/0249265 A1 | 9/2015 | Matsumura et al. |
| 2015/0255828 A1* | 9/2015 | Momo .................. H01M 4/583 |
| | | 429/127 |
| 2016/0254520 A1 | 9/2016 | Okuda et al. |
| 2016/0276705 A1 | 9/2016 | Hambitzer |

FOREIGN PATENT DOCUMENTS

| | | |
|---|---|---|
| JP | 2013044701 A | 3/2013 |
| JP | 2014035818 A | 2/2014 |
| JP | 2015002052 A | 1/2015 |
| JP | 2015076387 A | 4/2015 |
| JP | 2015088354 A | 5/2015 |
| JP | 2015090791 A | 5/2015 |
| WO | 2014/073470 A1 | 5/2014 |
| WO | 2014073468 A1 | 5/2014 |

* cited by examiner

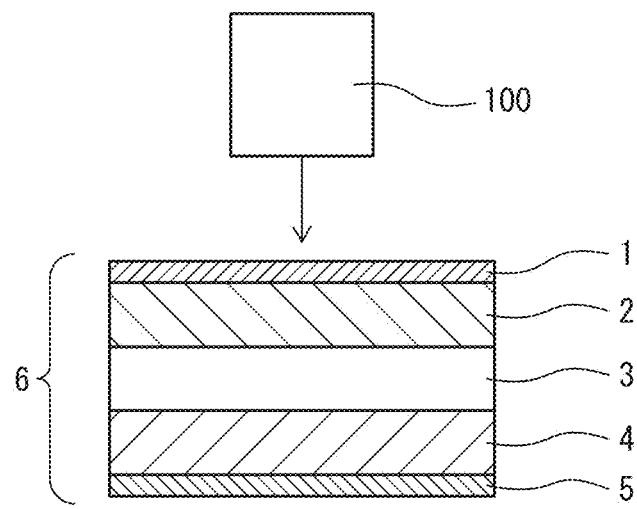
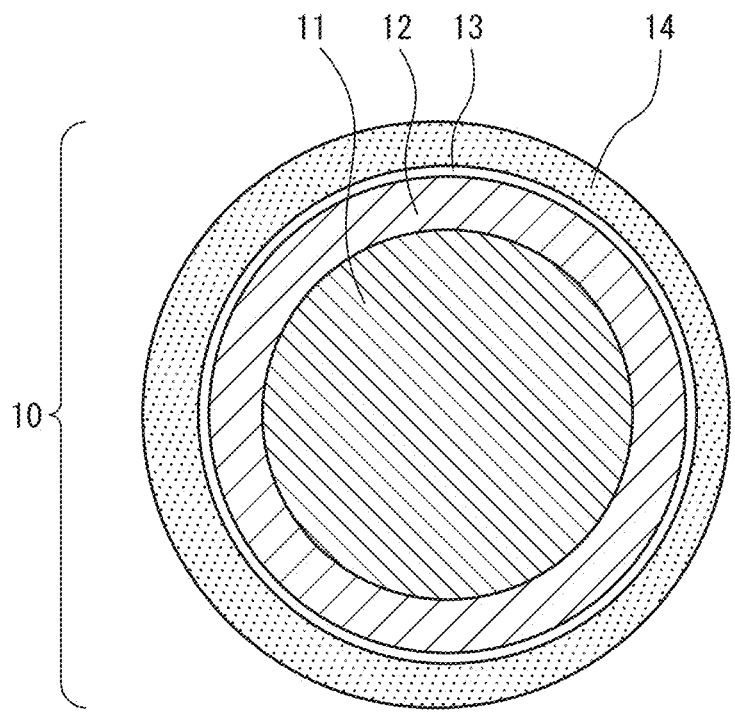

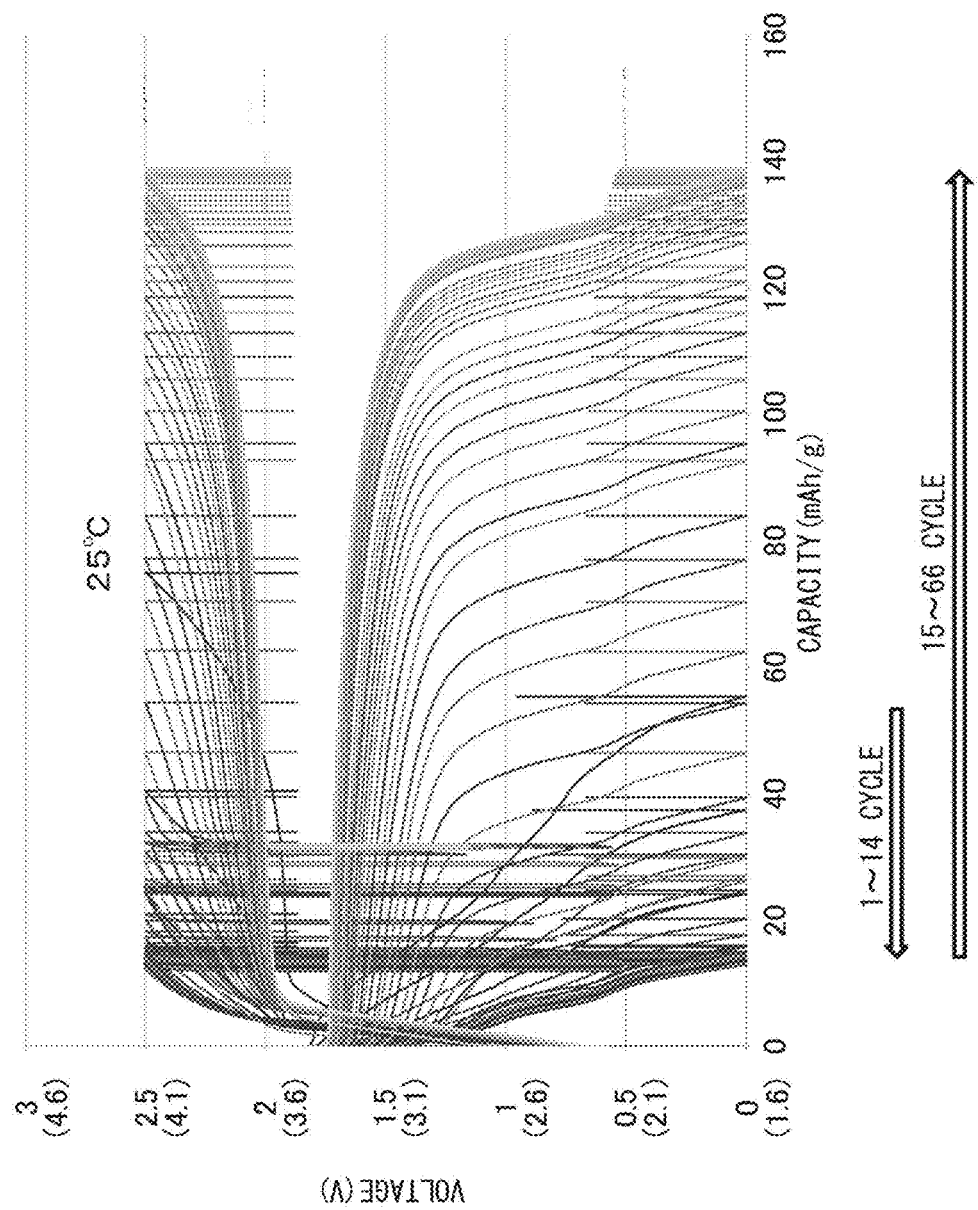

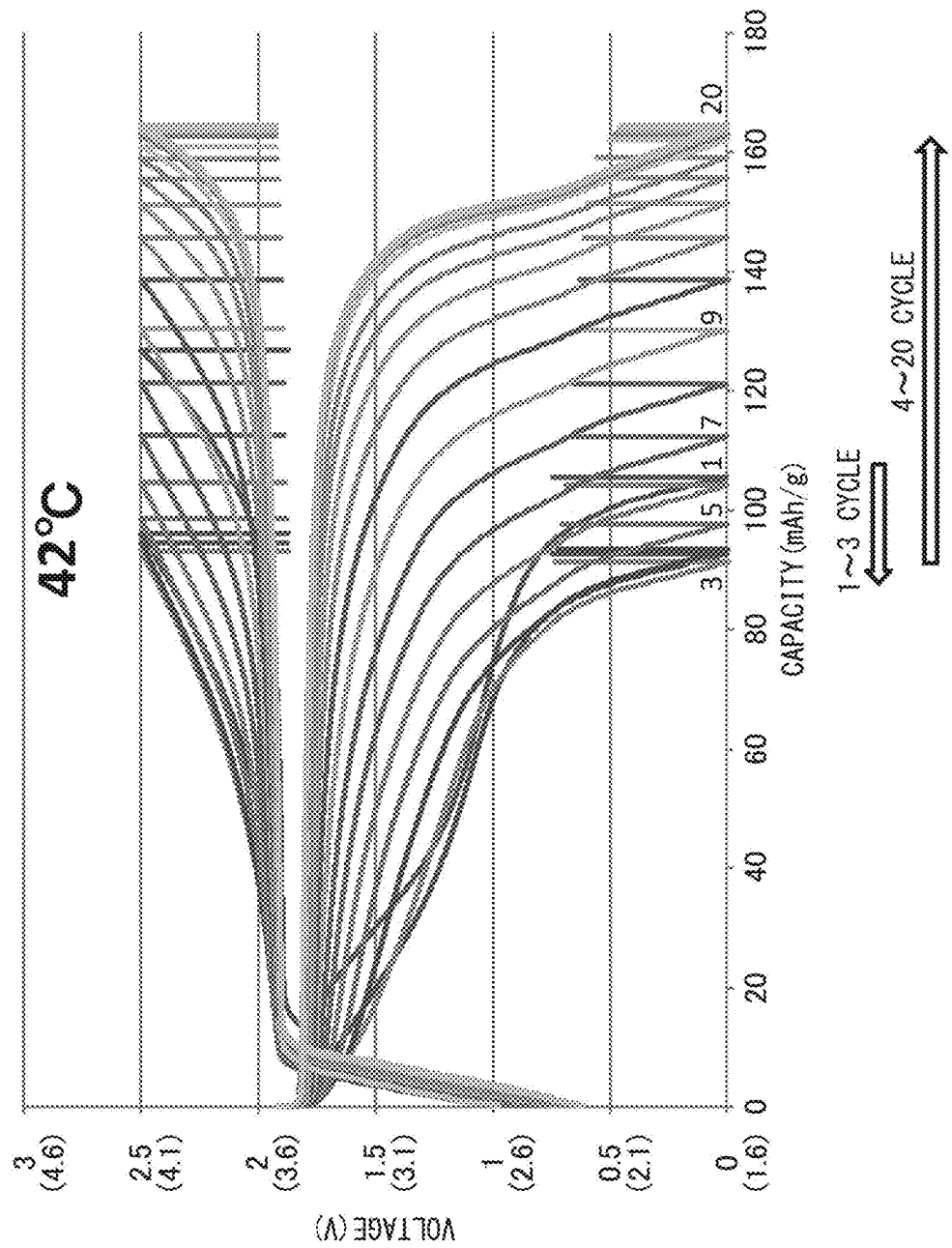

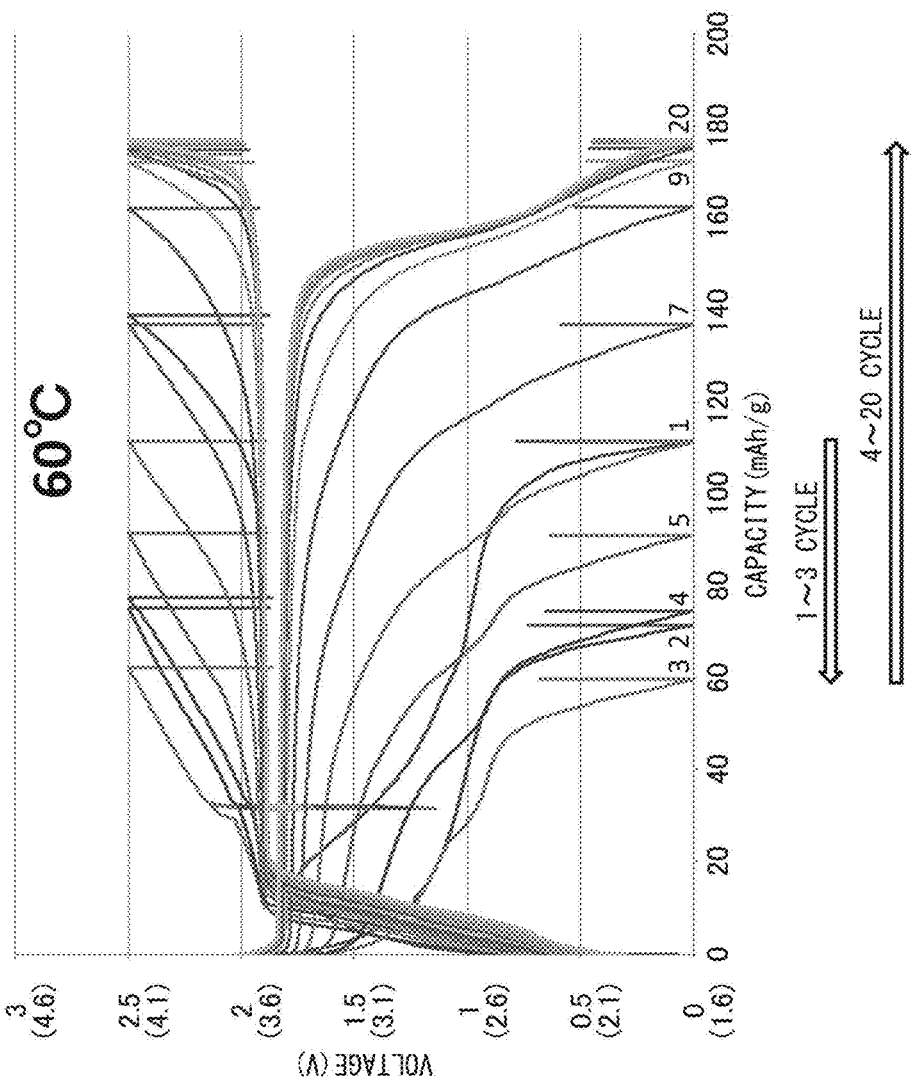

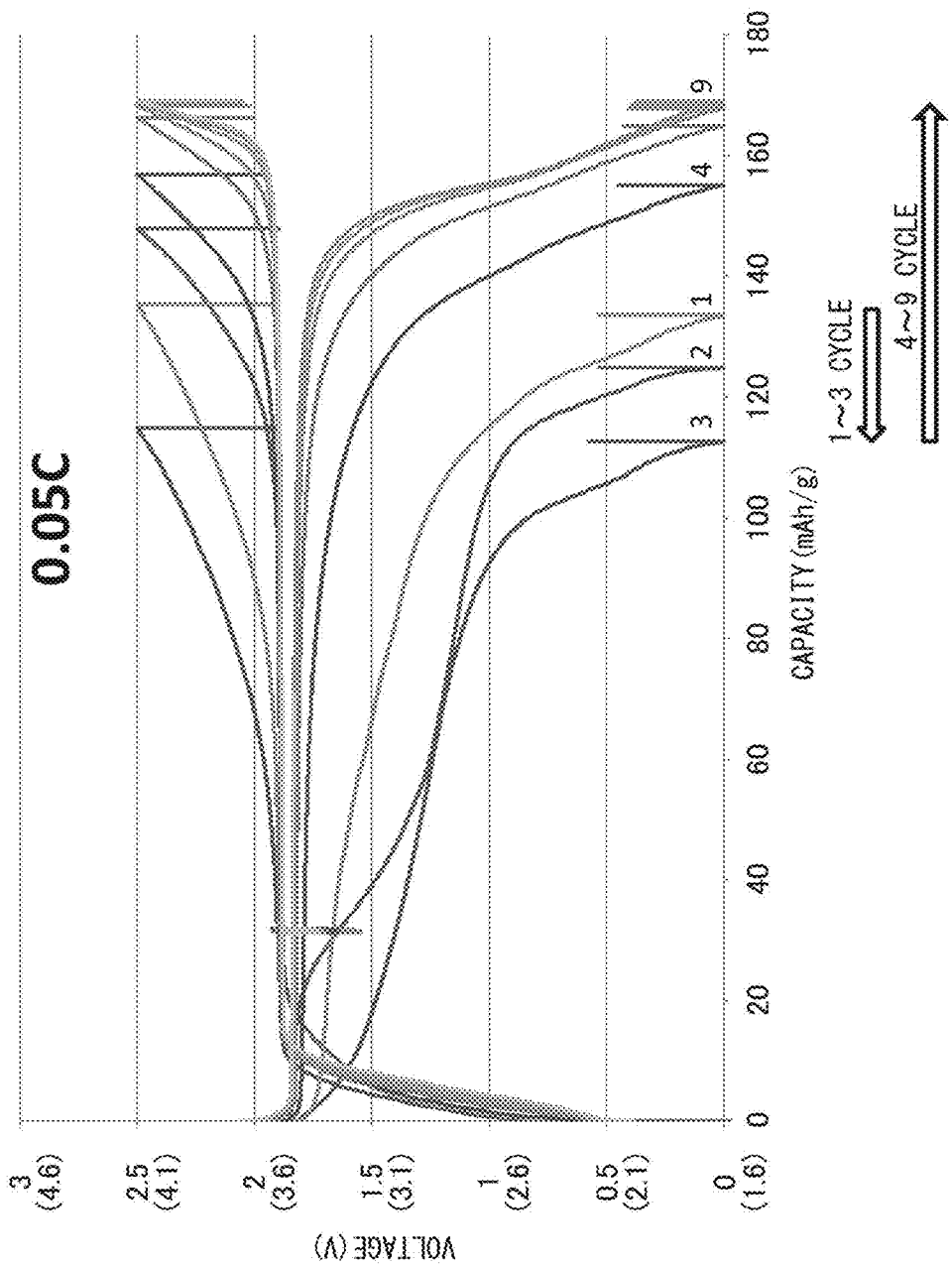

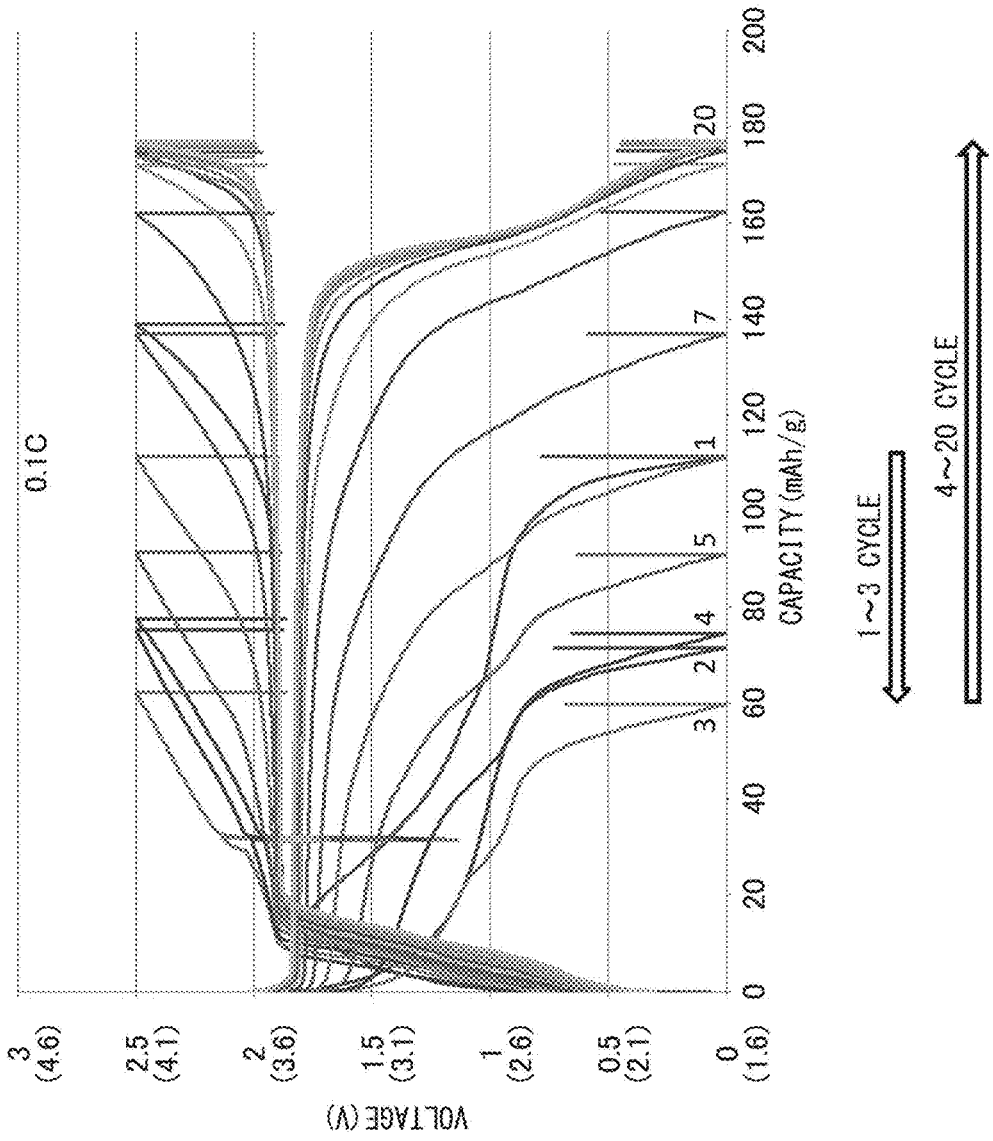

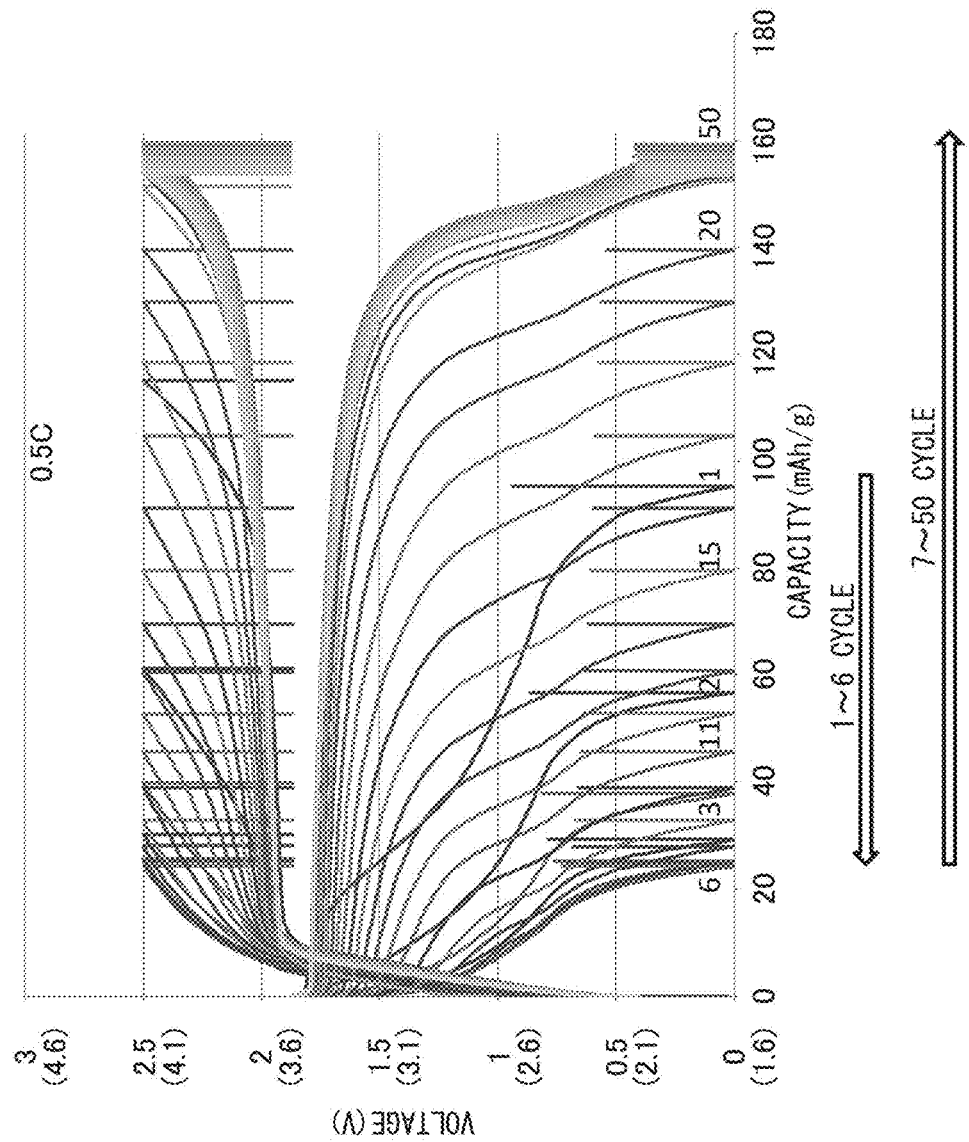

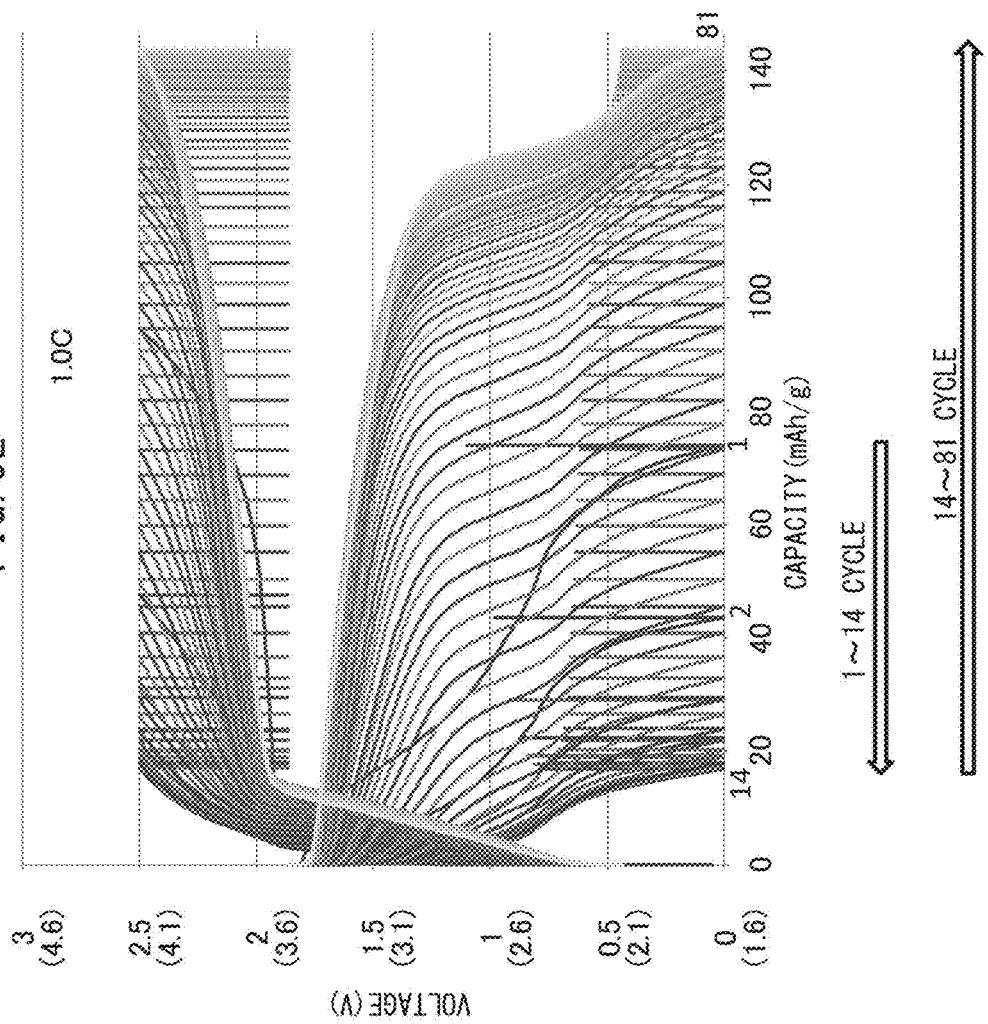

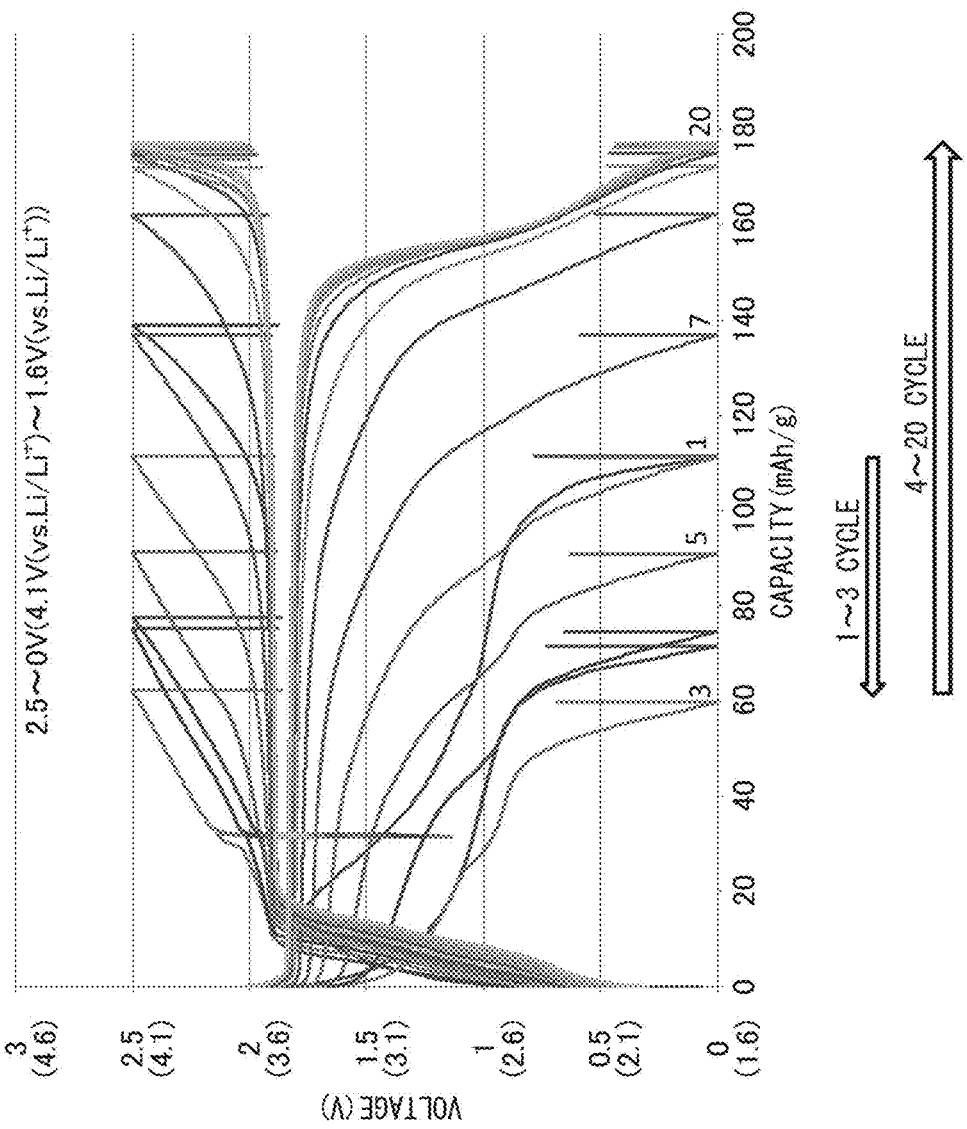

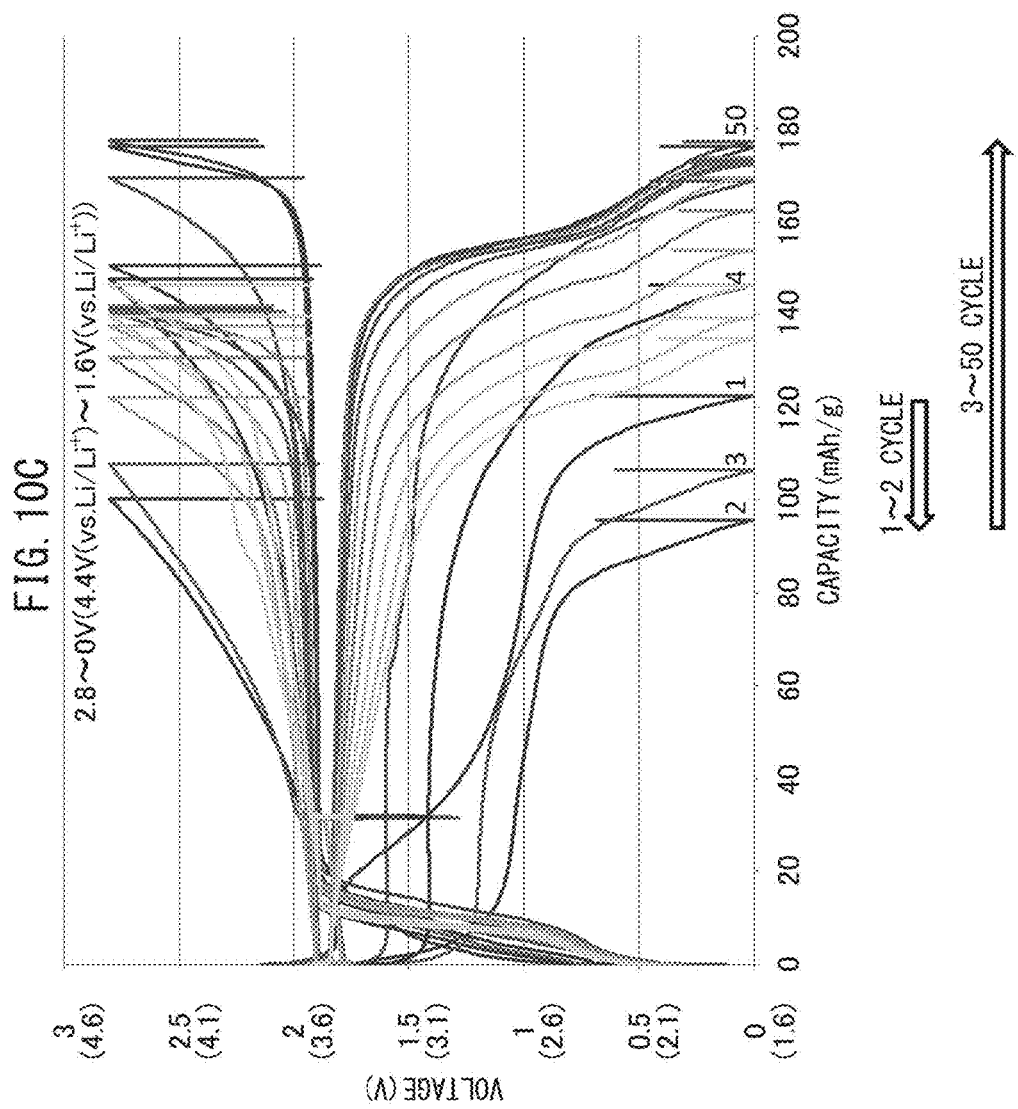

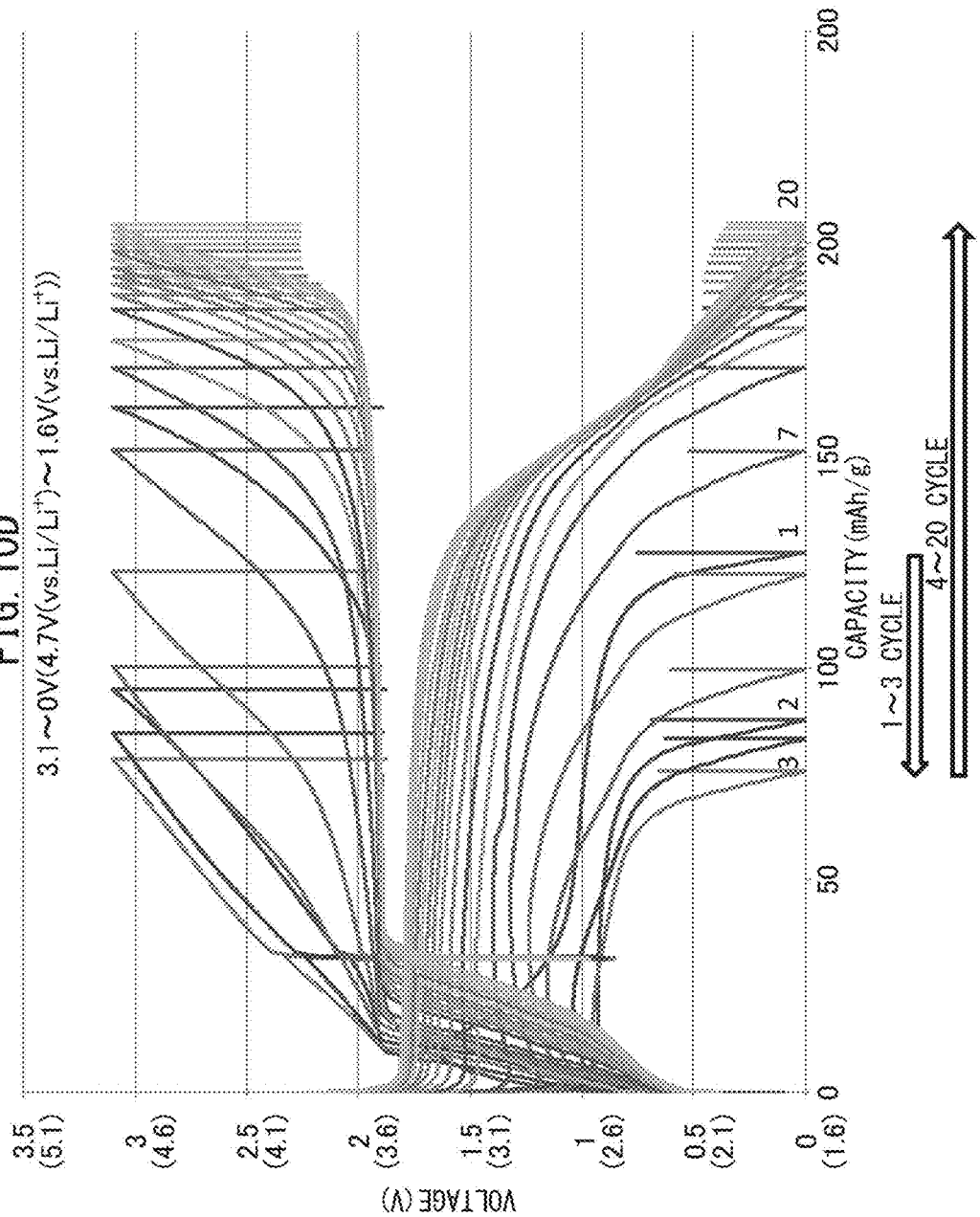

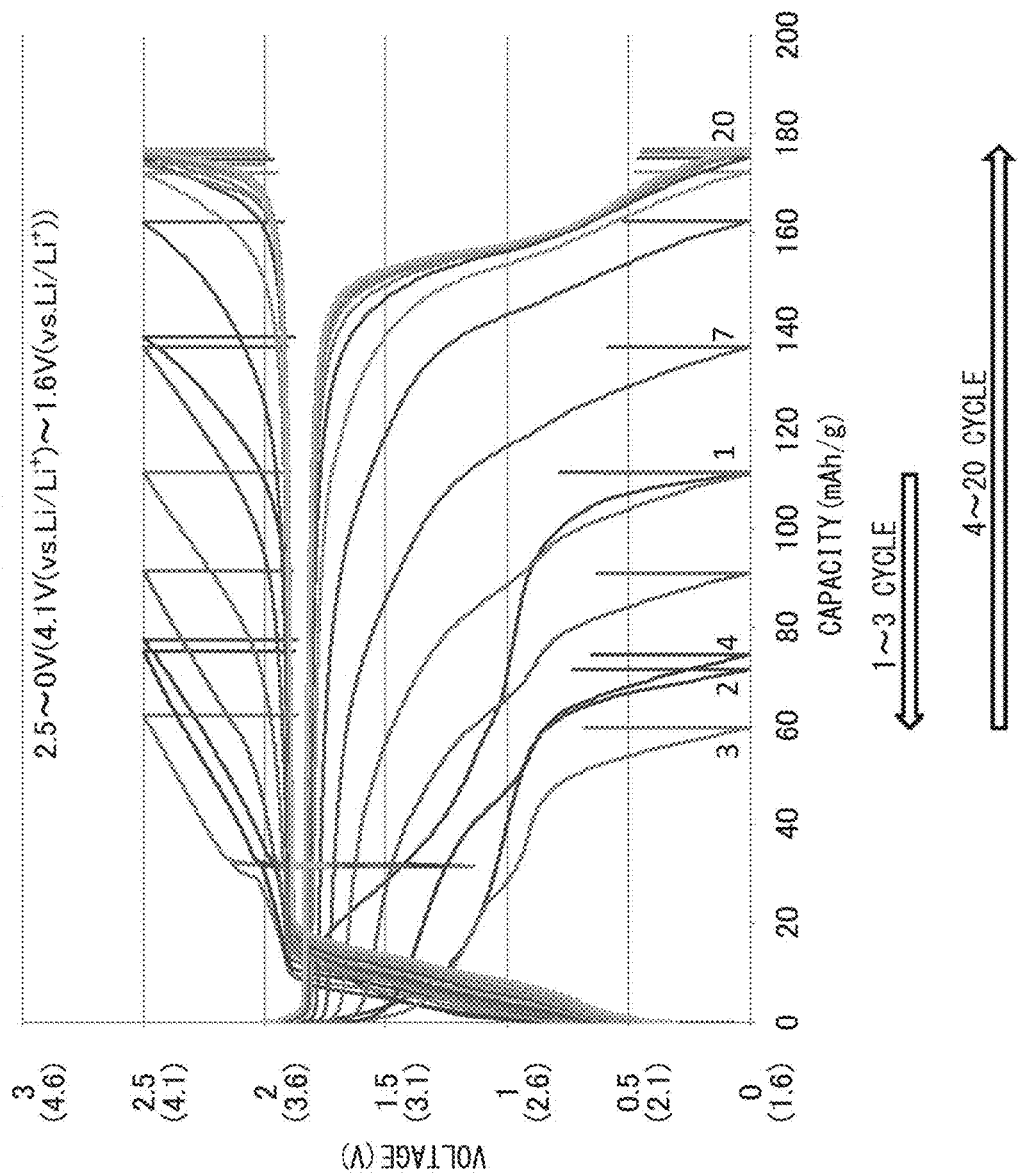

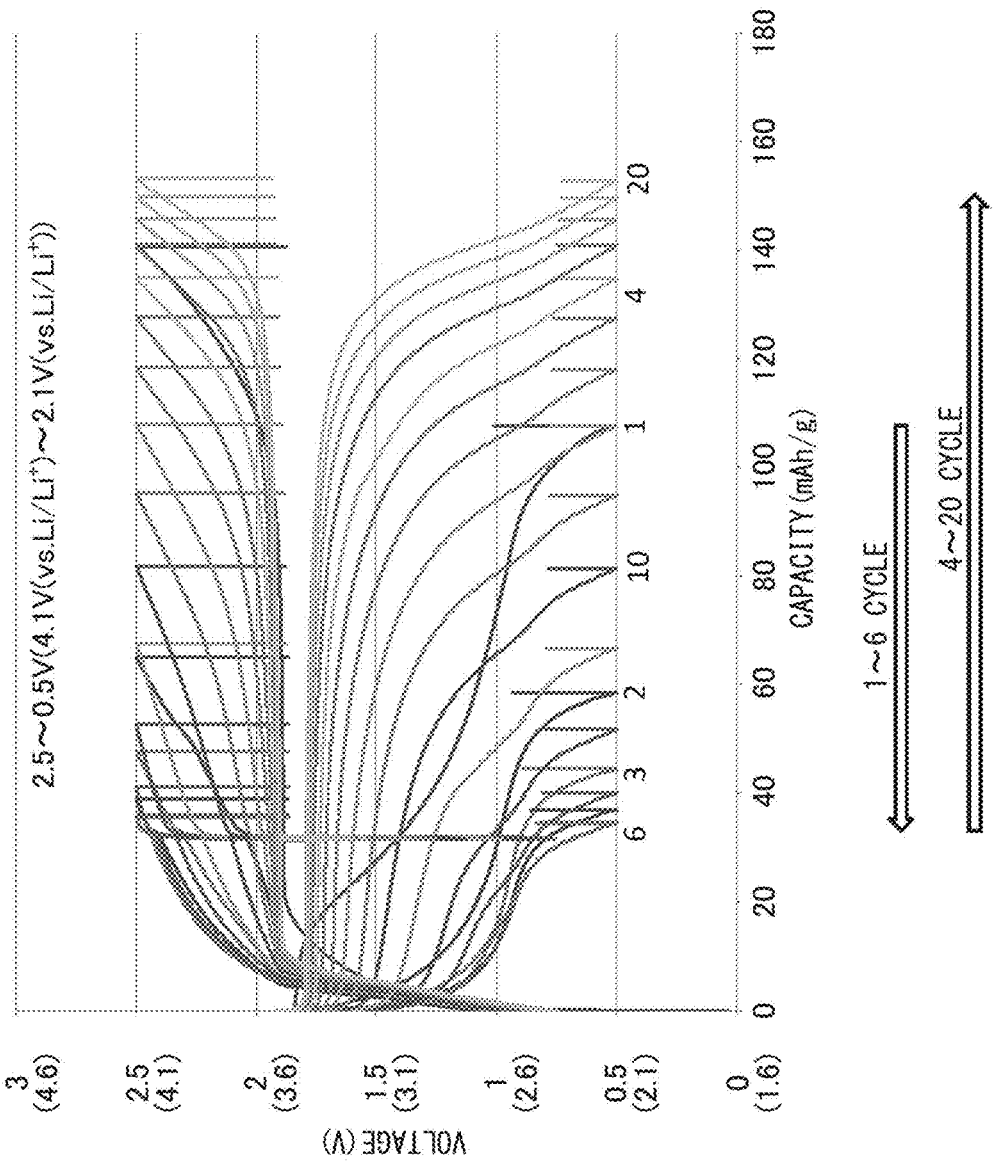

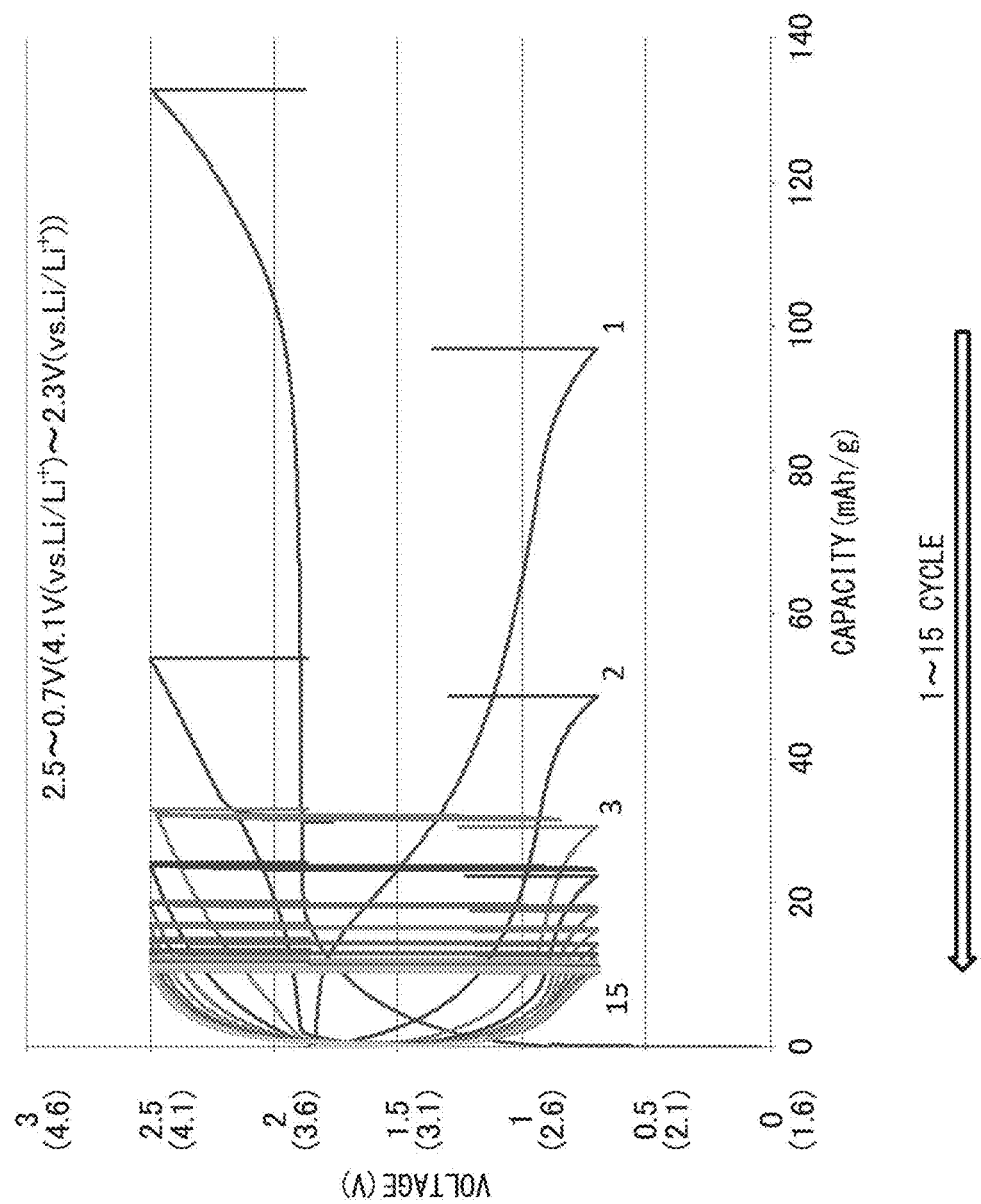

ALL-SOLID-STATE BATTERY SYSTEM

CROSS-REFERENCE TO RELATED APPLICATIONS

This application claims priority to Japanese Patent Application No. 2015-234227 filed on Nov. 30, 2015, the entire contents of which are hereby incorporated by reference.

TECHNICAL FIELD

The present disclosure relates to an all-solid-state battery system that uses an all-solid-state battery using an olivine-type positive electrode active material.

BACKGROUND ART

Among the various types of batteries available at present, lithium ion batteries are attracting attention from the viewpoint of their high energy density. Among these batteries, all-solid-state batteries, in which the electrolytic solution has been replaced with a solid electrolyte, are attracting particular attention. This is because, differing from secondary batteries using an electrolytic solution, since all-solid-state batteries do not use an electrolytic solution, there is no degradation of the electrolytic solution caused by overcharging and these batteries have high cycling characteristics and high energy density.

Olivine-type positive electrode active materials are known to be used for the positive electrode active materials used in lithium ion batteries. Olivine-type positive electrode active materials have a more stable structure and higher cycling characteristics in comparison with other positive electrode active materials. Consequently, research has recently been conducted on all-solid-state batteries using olivine-type positive electrode active materials.

Patent Document 1 and 2 are examples of the patent literature relating to all-solid-state batteries using an olivine-type positive electrode active material.

In Patent Document 1, an electron conduction path is formed in a positive electrode active material layer by bonding filamentous carbon to an olivine-type positive electrode active material.

Patent Document 2 discloses a technology that uses a slurry containing a positive electrode active material and a binder in a method for producing a sulfide solid-state battery. Patent Document 2 also lists an olivine-type positive electrode active material as an example of a positive electrode active material.

In addition, research has been conducted on a technology for making the capacity ratio between a positive electrode active material layer and a negative electrode active material layer to be a specific ratio in a solution-based battery and all-solid-state battery.

Patent Document 3 discloses a battery system in which a solution-based battery and an all-solid-state battery are connected in parallel, wherein the ratio of the capacity of a negative electrode active material layer to the capacity of a positive electrode active material layer in the solution-based battery is made to be larger than the ratio of the capacity of a negative electrode active material layer to the capacity of a positive electrode active material layer in the all-solid-state battery. As a result, the all-solid-state battery shorts out prior to overcharging, thereby preventing the solution-based all-solid-state battery from shorting out.

Patent Document 4 discloses a solution-based battery that uses an electrolytic solution obtained by dissolving a lithium salt in water, wherein the attainable potential of the positive electrode active material layer during charging is lowered by making the ratio of the capacity of a negative electrode active material layer to the capacity of a positive electrode active material layer to be 0.5 to 1.0.

Patent Document 5 discloses an all-solid-state battery designed so that the capacity of a positive electrode active material layer is lower than the capacity of a negative electrode active material layer. As a result, lithium metal is inhibited from being deposited on the negative electrode active material layer during charging.

PRIOR ART DOCUMENTS

Patent Documents

[Patent Document 1] International Publication No. WO 2014/073470
[Patent Document 2] Japanese Unexamined Patent Publication No. 2015-076387
[Patent Document 3] Japanese Unexamined Patent Publication No. 2013-044701
[Patent Document 4] Japanese Unexamined Patent Publication No. 2007-172986
[Patent Document 5] Japanese Unexamined Patent Publication No. 2015-088354

SUMMARY

Problems to be Solved

When an all-solid-state battery that uses an olivine-type positive electrode active material and sulfide solid electrolyte is charged and discharged, there are cases in which the actual battery capacity is less than the theoretical capacity. This is because, when this type of all-solid-state battery is charged, the olivine-type positive electrode active material and sulfide solid electrolyte undergo a chemical reaction, and a resistive layer is formed at the interface between the olivine-type positive electrode active material and sulfide solid electrolyte.

As a result of conducting extensive research on this type of all-solid-state battery, the inventors of the present disclosure found that internal resistance of the battery can be decreased and battery capacity can be increased by repeating charging and discharging under certain conditions.

As a result of conducting additional research on this type of all-solid-state battery, and particularly on an all-solid-state battery in which the positive electrode active material layer is fabricated using a method consisting of coating a slurry of a positive electrode active material, the inventors of the present disclosure found that, in addition to repeating charging and discharging under certain conditions, by lowering the ratio of the capacity of the negative electrode active material layer to the capacity of the positive electrode active material layer, internal resistance of the battery can be further decreased and battery capacity can be further increased.

Thus, the present disclosure provides an all-solid-state battery system that is capable of decreasing internal resistance and increasing battery capacity of an all-solid-state battery using an olivine-type positive electrode active material for the positive electrode active material and using a sulfide solid electrolyte for the solid electrolyte.

Means for Solving the Problems

Means for solving the problems of the present disclosure are as indicated below.

1. An all-solid-state battery system having an all-solid state battery and a control device, the all-solid-state battery having a positive electrode active material layer, a solid electrolyte layer and a negative electrode active material layer, the control device controlling the lower limit discharge potential of the positive electrode active material layer of the all-solid-state battery; wherein, the positive electrode active material layer and/or the solid electrolyte layer have a sulfide solid electrolyte, the positive electrode active material layer has an olivine-type positive electrode active material having formula $Li_xM_yPO_z$, wherein, M represents Fe, Mn, Co or Ni, x is such that 0.5≤x≤1.5, y is such that 0.5≤y≤1.5 and z is such that 2≤z≤7, the capacity of the negative electrode active material layer is lower than the capacity of the positive electrode active material layer, and the control device controls the lower limit discharge potential of the positive electrode active material layer during normal use of the all-solid-state battery to within the range of 1.6 V vs. $Li/Li^+$ to 2.1 V vs. $Li/Li^+$.

2. The all-solid-state battery system described in said 1 above, wherein the ratio of the capacity of the negative electrode active material layer to the capacity of the positive electrode active material layer is 0.95 or less.

3. The all-solid-state battery system described in 1 or 2 above, wherein the olivine-type positive electrode material is $LiFePO_4$.

4. The all-solid-state battery system described in any of 1 to 3 above, wherein the control device controls the charge-discharge rate during normal use of the all-solid-state battery to 1.0 C or less.

5. The all-solid-state battery system described in any of 1 to 4 above, wherein the control device controls the upper limit charging potential of the positive electrode active material layer during normal use of the all-solid-state battery to 3.8 V vs. $Li/Li^+$ to 4.4 V vs. $Li/Li^+$.

6. A method for producing an all-solid-state battery having a positive electrode active material layer, a solid electrolyte layer and a negative electrode active material layer, wherein the positive electrode active material layer and/or the solid electrolyte layer have a sulfide solid electrolyte, the positive electrode active material layer has an olivine-type positive electrode active material having formula $Li_xM_yPO_z$, wherein, M represents Fe, Mn, Co and Ni, x is such that 0.5≤x≤1.5, y is such that 0.5≤y≤1.5 and z is such that 2≤z≤7, the capacity of the negative electrode active material layer is lower than the capacity of the positive electrode active material layer, and the method comprises carrying out charge-discharge cycling in which the positive electrode active material layer is discharged to 1.6 V vs. $Li/Li^+$ to 2.1 V vs. $Li/Li^+$ while maintaining the temperature of the all-solid-state battery at 25° C. to 80° C.

Effects

According to the present disclosure, an all-solid-state battery system can be provided that is capable of decreasing internal resistance and increasing capacity of an all-solid-state battery using an olivine-type positive electrode active material for the positive electrode active material and using a sulfide solid electrolyte for the solid electrolyte.

BRIEF DESCRIPTION OF THE DRAWINGS

FIG. 1 is a schematic representation of the all-solid-state battery system of the present disclosure.

FIG. 2 is a schematic cross-sectional view of a positive electrode active material which has been obtained by charging an all-solid-state battery having an olivine-type positive electrode active material and a sulfide solid electrolyte.

FIG. 8A is a graph representing the relationship between voltage and battery capacity of an all-solid-state battery which has been repeatedly charged and discharged while maintaining the temperature at 25° C.

FIG. 8B is a graph representing the relationship between voltage and battery capacity an all-solid-state battery which has been repeatedly charged and discharged while maintaining the temperature at 42° C.

FIG. 8C is a graph representing the relationship between voltage and battery capacity of an all-solid-state battery which has been repeatedly charged and discharged while maintaining the temperature at 60° C.

FIG. 9B is a graph representing the relationship between voltage and battery capacity when charge-discharge cycling has been repeated while maintaining the charge-discharge rate at 0.05 C.

FIG. 9C is a graph representing the relationship between voltage and battery capacity when charge-discharge cycling has been repeated while maintaining the charge-discharge rate at 0.1 C.

FIG. 9D is a graph representing the relationship between voltage and battery capacity when charge-discharge cycling has been repeated while maintaining the charge-discharge rate at 0.5 C.

FIG. 9E is a graph representing the relationship between voltage and battery capacity when charge-discharge cycling has been repeated while maintaining the charge-discharge rate at 1.0 C.

FIG. 10B is a graph representing the relationship between voltage and battery capacity when charge-discharge cycling has been repeated while maintaining the upper limit charging potential of a positive electrode active material layer at 4.1 V (vs. Li/Li$^+$).

FIG. 10C is a graph representing the relationship between voltage and battery capacity when charge-discharge cycling has been repeated while maintaining the upper limit charging potential of a positive electrode active material layer at 4.4 V (vs. Li/Li$^+$).

FIG. 10D is a graph representing the relationship between voltage and battery capacity when charge-discharge cycling has been repeated while maintaining the upper limit charging potential of a positive electrode active material layer at 4.7 V (vs. Li/Li$^+$).

FIG. 11A is a graph representing the relationship between voltage and battery capacity when charge-discharge cycling has been repeated while maintaining the lower limit discharge potential of a positive electrode active material layer at 1.6 V (vs. Li/Li$^+$).

FIG. 11B is a graph representing the relationship between voltage and battery capacity when charge-discharge cycling has been repeated while maintaining the lower limit discharge potential of a positive electrode active material layer at 2.1 V (vs. Li/Li$^+$).

FIG. 11C is a graph representing the relationship between voltage and battery capacity when charge-discharge cycling has been repeated while maintaining the lower limit discharge potential of a positive electrode active material layer at 2.3 V (vs. Li/Li$^+$).

DETAILED DESCRIPTION

Figure 3:
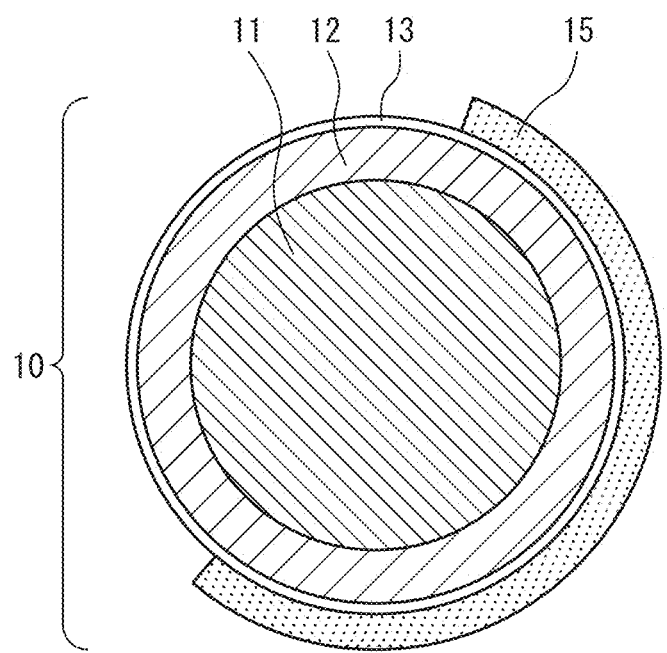
FIG. 3 is a schematic cross-sectional view of a positive electrode active material obtained by using the all-solid-state battery system of the present disclosure.

The following provides a detailed description of embodiments of the present disclosure. Furthermore, the present disclosure is not limited to the following embodiments, but rather can be modified in various ways within the scope of the gist thereof.

<<All-Solid-State Battery System of the Present Disclosure>>

The all-solid-state battery system of the present disclosure is an all-solid-state battery system having an all-solid-state battery, the all-solid state battery having a positive electrode active material layer, a solid electrolyte layer and a negative electrode active material layer, and a control device that controls the lower limit discharge potential of the positive electrode active material layer of the all-solid-state battery. The positive electrode active material layer and/or the solid electrolyte layer have a sulfide solid electrolyte. In addition, the positive electrode active material layer has an olivine-type positive electrode active material ($Li_xM_yPO_z$, wherein, M represents Fe, Mn, Co and Ni, x is such that 0.5≤x≤1.5, y is such that 0.5≤y≤1.5 and z is such that 2≤z≤7). In addition, the capacity of the negative electrode active material layer is lower than the capacity of the positive electrode active material layer. In addition, the control device controls the lower limit discharge potential of the positive electrode active material layer during normal use of the all-solid-state battery to within the range of 1.6 V (vs. Li/Li$^+$) to 2.1 V (vs. Li/Li$^+$).

FIG. 1 is a schematic diagram illustrating one embodiment of the present disclosure. As shown in FIG. 1, the all-solid-state battery system of the present disclosure has an all-solid-state battery (6) and a control device (100) that controls the lower limit discharge potential of a positive electrode active material layer (2) of the all-solid-state battery (6). Here, the all-solid-state battery (6) has a positive electrode current collector (1), the positive electrode active material layer (2), a sulfide solid electrolyte layer (3), a negative electrode active material layer (4) and a negative electrode current collector (5) in that order. In addition, the control device (100) controls the lower limit discharge potential of the positive electrode active material layer (2) during normal use of the all-solid-state battery (6). Furthermore, FIG. 1 merely indicates one embodiment of the present disclosure, and is not intended to limit the content of the present disclosure.

The operating principle of the present disclosure is thought to be as indicated below, although the present disclosure is not limited by that principle.

When an all-solid-state battery that uses an olivine-type positive electrode active material and sulfide solid electrolyte is charged, there are cases in which the actual capacity of the positive electrode active material of the battery is considerably lower than the theoretical capacity of the positive electrode active material. This is because the olivine-type positive electrode active material and sulfide solid electrolyte undergo a chemical reaction during charging of the battery, and a resistive layer having low lithium ion conductivity is formed at the interface between the olivine-type positive electrode active material and sulfide solid electrolyte.

Simultaneous to the formation of this resistive layer, the constituent element of the olivine-type positive electrode active material in the form of a transition metal is eliminated therefrom on the inside of this resistive layer, namely at the interface between this resistive layer and the olivine-type positive electrode active material, resulting in the formation of a coating layer. This coating layer is a stable phosphate layer that contains little transition metal and exhibits little reactivity with the sulfide solid electrolyte. Consequently, this coating layer has the function of a protective layer that inhibits the olivine-type positive electrode active material from reacting with the sulfide solid electrolyte during charging and discharging of the battery.

Incidentally, FIG. 2 is a schematic cross-sectional view representing the state of a primary particle of an olivine-type positive electrode active material which has been obtained by charging an all-solid-state battery that uses an olivine-type positive electrode active material and a sulfide solid electrolyte. As shown in FIG. 2, when an all-solid-state battery has been charged in this manner, a transition element, which is a constituent of the olivine-type positive electrode active material, and sulfur, which is a constituent of the sulfur solid electrolyte, react in the vicinity of the surface of the primary particle of the olivine-type positive electrode active material, resulting in the formation of a resistive layer (14) on the surface of the primary particle. At the same time, a coating layer (12) is formed in the vicinity of the surface of the primary particle of the olivine-type positive electrode active material. Incidentally, the primary particle of the olivine-type positive electrode active material of FIG. 2 has a carbon coating layer (13). However, it should be understood that this carbon coating layer (13) is not an essential constituent.

Thus, if it were possible to remove this resistive layer, it would be possible to fabricate a sulfide solid-state battery that has the theoretical capacity of the olivine-type positive electrode active material and demonstrates high cycling characteristics.

The inventors of the present disclosure found that this resistive layer can be removed by repeatedly subjecting an all-solid-state battery using an olivine-type positive electrode active material and sulfide solid electrolyte to charge-discharge cycling under certain conditions.

FIG. 3 is a schematic cross-sectional view of a primary particle of an olivine-type positive electrode active material from which the resistive layer has been removed by repeating charge-discharge cycling under certain conditions. In FIG. 3, the primary particle (10) of this positive electrode active material has an olivine-type positive electrode material (11) and a coating layer (12) coating the olivine-type positive electrode active material (11). Moreover, the primary particle (10) has a transition metal-containing sulfide region (15) that coats a portion of this coating layer (12). Furthermore, this primary particle of the olivine-type positive electrode active material of FIG. 3 has a carbon coating layer (13). However, it should be understood that this carbon coating layer (13) is not an essential constituent.

Figure 4:
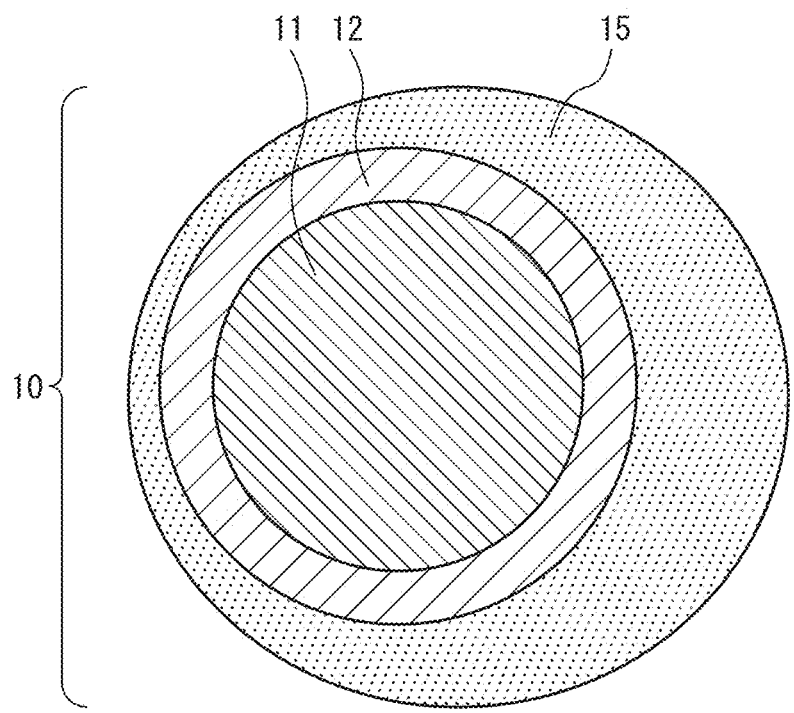
FIG. 4 is a schematic cross-sectional view of an olivine-type positive electrode active material on which a resistive layer has been formed on the surface thereof.

The mechanism by which this resistive layer is removed is thought to be as indicated below. First, as shown in FIG. 4, when an all-solid-state battery using an olivine-type positive electrode active material and sulfide solid electrolyte is charged, a resistive layer (14) is formed at the interface between the sulfide solid electrolyte and the olivine-type positive electrode active material of the primary particle (10) of the positive electrode active material. In addition, the coating layer (12) is simultaneously formed between the resistive layer and the olivine-type positive electrode active material (11). In the case $LiFePO_4$ and a sulfide solid electrolyte are used, this reaction is thought to proceed in the manner of the reaction formula indicated below (and a similar reaction is thought to occur with respect to olivine-type positive electrode active materials other than $LiFePO_4$).

$FePO_4 + Li_3PS_4 \rightarrow FeS_2$ (resistive layer) $+ Li_4P_2O_7$ (coating layer) $+ Li + e^-$ It is believed that due to this reaction, a resistive layer having $FeS_2$ and a coating layer having $Li_4P_2O_7$ are thought to be formed. In addition, this reaction occurs during the first cycle or first several cycles of charge-discharge cycling.

Subsequently in the method of the present disclosure, a reaction occurs between transition metal sulfide that composes this resistive layer and lithium ions during the initial discharge cycles. This reaction is thought to consist of two types of reactions. The first reaction is a reaction in which lithium ions are inserted into the transition metal sulfide resulting in the formation of $Li_xFeS_x$. This reaction occurs in the vicinity of about 2.5 V (vs. $Li/Li^+$). The other reaction is a reaction (conversion reaction) in which transition metal present in the transition metal sulfide is replaced with lithium resulting in the formation of $Li_2S$. This reaction occurs in the vicinity of about 2.1 V (vs. $Li/Li^+$). These reactions are thought to proceed in the manner of the reaction formulas indicated below.

Figure 5:
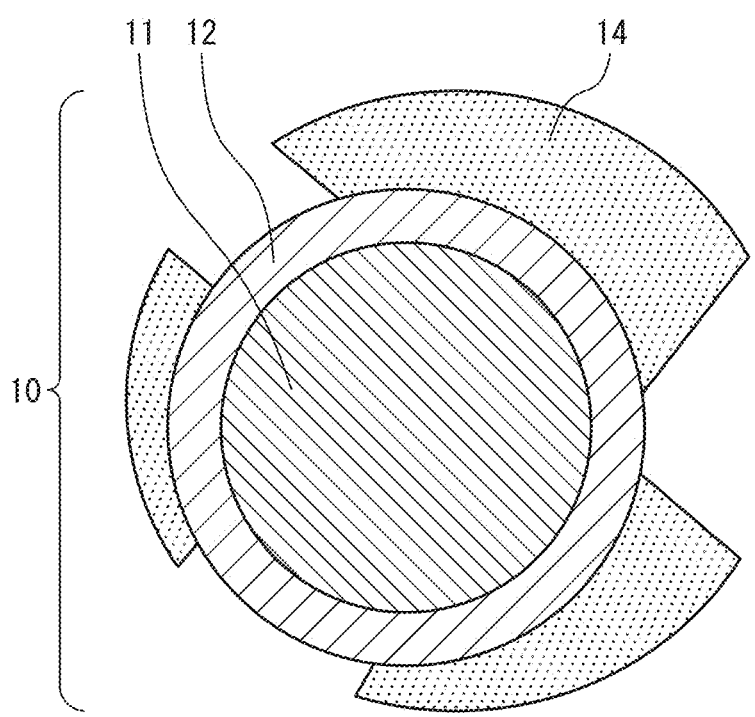
FIG. 5 is a schematic cross-sectional view of an olivine-type positive electrode active material in which a resistive layer on the surface thereof has been destroyed.

$FeS_x + xLi^+ + xe^- \rightarrow Li_xFeS_x$ $FeS_x + 2xLi^+ + 2xe^- \rightarrow Li_2S + Fe$ As shown in FIG. 5, in the method of the present disclosure, when charge-discharge cycling is subsequently further repeated, the conversion reaction by which transition metal present in the transition metal sulfide is replaced with lithium during discharge continues to proceed. In addition, transition metal alone or compounds thereof formed by this reaction during discharge become ionized, and as a result of the diffusion of these ions, the resistive layer composed of transition metal sulfide is destroyed. These reactions are thought to proceed in the manner of the reaction formulas indicated below.

$Fe \rightarrow Fe^{x+} + xe^-$ (during charging)

$FeS_x + 2xLi^+ + 2xe^- \rightarrow Li_2S + Fe$ (during discharge)

Figure 7:
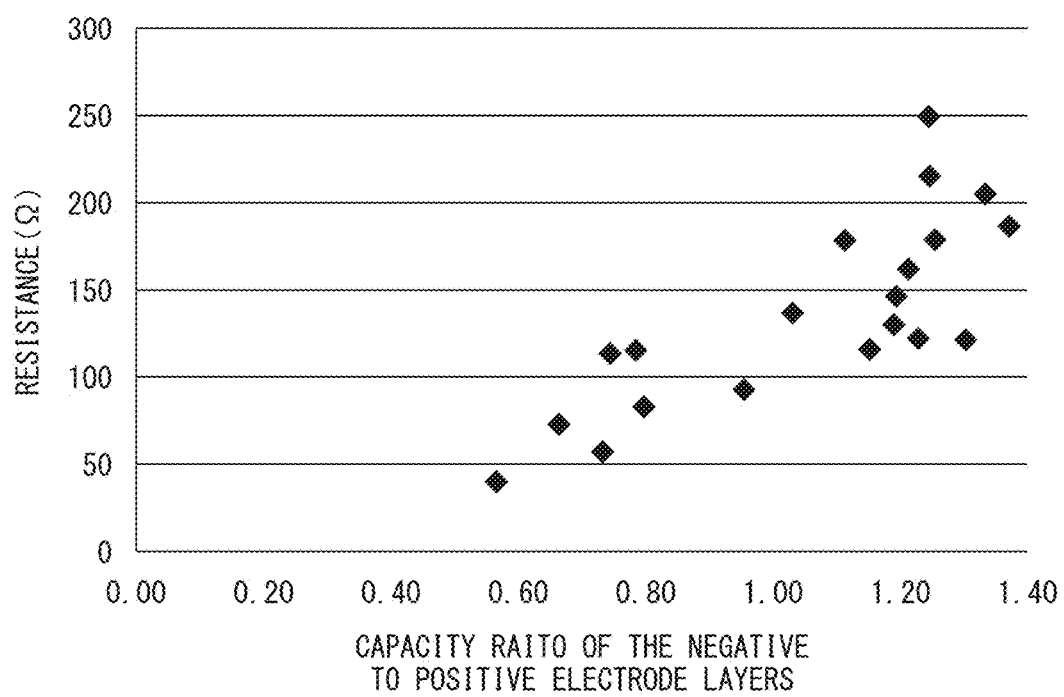
FIG. 7 is a graph representing the relationship between the ratio of the capacity of a negative electrode active material layer to the capacity of a positive electrode active material layer (negative electrode active material capacity/positive electrode active material capacity) and battery internal resistance.

As a result, the resistive layer present at the interface between the olivine-type positive electrode active material and sulfide solid electrolyte is removed. At the same time, as shown in FIG. 7, the $Li_2S$ formed during discharge diffuses into secondary particles of the positive electrode active material, and this is thought to result in the formation of lithium ion conduction paths within the secondary particles.

As a result of discharging to an electrical potential lower than the electrical potential of about 2.1 V (vs. $Li/Li^+$) at which this reaction occurs in the positive electrode active material layer, the conversion reaction by which transition metal in the transition metal sulfide is replaced with lithium is able to proceed efficiently. Consequently, by carrying out charge-discharge cycling in which discharging proceeds until the electrical potential of the positive electrode active material layer reaches about 2.1 V or lower (vs. $Li/Li^+$), the resistive layer can be removed and a sulfide solid-state battery can be fabricated that has the theoretical capacity of the olivine-type positive electrode active material and demonstrates high cycling characteristics.

In addition, by repeating charge-discharge cycling while controlling not only the lower limit of the electrical potential of the positive electrode active material layer during charging (to referred to as the "lower limit discharge potential"), but also the upper limit of the electrical potential of the positive electrode active material layer during charging (to be referred to as the "upper limit charging potential"), the charge-discharge rate and/or the temperature of the battery to certain conditions, a sulfide solid-state battery can be fabricated more efficiently that has battery capacity that is closer to the theoretical capacity.

During charging of the battery, the reaction by which the resistive layer is formed occurs more frequently the higher the electrical potential. If the resistive layer becomes large, it cannot be removed unless subsequent charge-discharge cycling is repeated numerous times. In addition, at a high upper limit charging potential, other side reactions occur causing the internal resistance of the all-solid-state battery to become large following completion thereof. Thus, these side reactions may be suppressed by maintaining the upper limit charging potential to a certain potential or lower.

In addition, when the charge-discharge rate has been lowered, a longer amount of time is required to reach the electrical potential at which the conversion reaction by which transition metal in the transition metal sulfide is replaced with lithium occurs. As a result, the number of reactions that occur due to a single charge-discharge cycle can be increased. Consequently, the number of charge-discharge cycles required to remove the resistive layer can be reduced by lowering the charge-discharge rate.

In addition, the conversion reaction by which transition metal in the transition metal sulfide is replaced with lithium proceeds with difficulty in the case the temperature is excessively low. Conversely, although the reaction per se proceeds more rapidly in the case the temperature is excessively high, the positive electrode active material deteriorates due to the occurrence of other side reactions. Consequently, the temperature may be within a prescribed range during charge-discharge cycling.

As a result of conducting additional research, the inventors of the present disclosure additionally found that the battery capacity and internal resistance of an all-solid-state battery fabricated by carrying out charge-discharge cycling until the battery is discharged to about 2.1 V (vs. Li/Li$^+$) vary according to the method used to fabricate the positive electrode active material layer of the all-solid-state battery.

Examples of methods used to fabricate the positive electrode active material layer include a method consisting of pressing a powder of a positive electrode active material (referred to as "powder compacting") and a method consisting of dispersing a positive electrode active material in a dispersant, coating onto a metal foil and the like and drying (referred to as "slurry coating").

When carrying out charge-discharge cycling consisting of discharging to about 2.1 V (vs. Li/Li$^+$) on an all-solid state battery which is assembled by using a positive electrode active material layer fabricated by powder compacting and an all-solid state battery which is assembled by using a positive electrode active material fabricated by slurry coating, in contrast to the all-state-battery assembled using a positive electrode active material fabricated by powder compacting, the battery capacity increased and the internal resistance significantly decreased in the battery, in the all-solid-state battery assembled using a positive electrode active material layer fabricated by slurry coating, the battery capacity hardly increases and internal resistance of the battery hardly decreases.

In this manner, the cause of the differences in battery capacity and internal resistance depending on the method used to fabricate the positive electrode active material layer of an all-solid-state battery when charge-discharge cycling consisting of discharging until the electrical potential of the positive electrode active material layer reaches about 2.1 V (vs. Li/Li$^+$) is carried out is not clear. However, this is most likely due to the fact that, since the dispersed state of the positive electrode active material is not uniform in a positive electrode active material layer fabricated by slurry coating, and since binder adheres to the active material interface, the reaction does not proceed adequately at the positive electrode active material interface, thereby preventing the resistive layer from being adequately destroyed even if charge-discharge cycling is repeated.

As a result of conducting additional research, the inventors of the present disclosure found that, by designing the capacity of the positive electrode active material layer to be larger than the capacity of the negative electrode active material layer in an all-solid state battery assembled using a positive electrode active material layer fabricated by slurry coating, the battery capacity can be further increased and internal resistance of the battery can be further decreased when charge-discharge cycling consisting of discharging to about 2.1 V (vs. Li/Li$^+$) has been carried out.

Figure 6A:
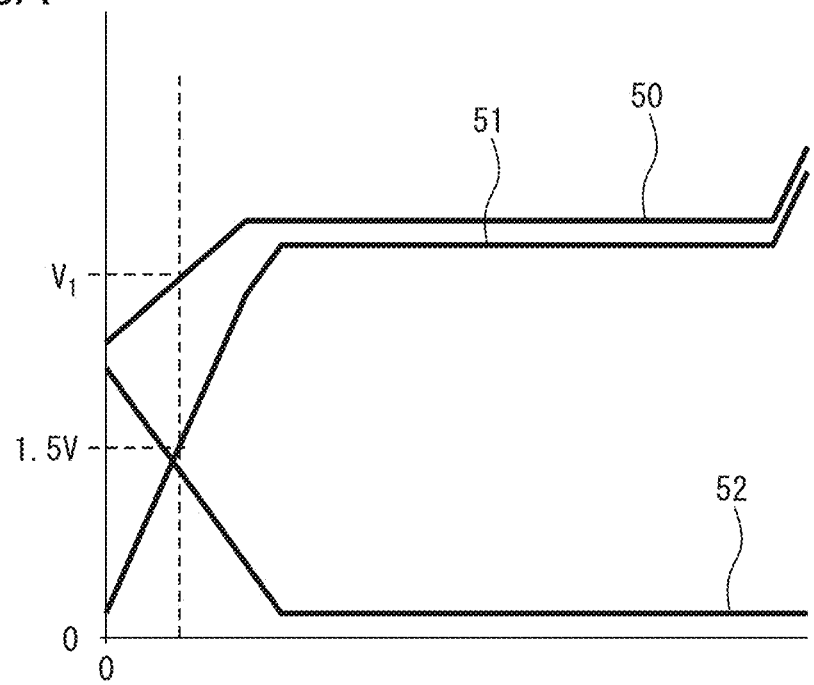
FIG. 6A depicts a graph representing the changes in electrical potential and battery voltage of a positive electrode active material layer and a negative electrode active material layer.

The graph of FIG. 6A represents changes in the electrical potential (50) of a positive electrode active material layer, the electrical potential (52) of a negative electrode active material layer, and a battery voltage (51) when an all-solid-state battery in which the capacity of the negative electrode active material layer is higher than the capacity of the positive electrode active material layer has been discharged. In FIG. 6A, V$_1$ represents the electrical potential (50) of the positive electrode active material layer when the battery was discharged to a prescribed voltage.

Figure 6B:
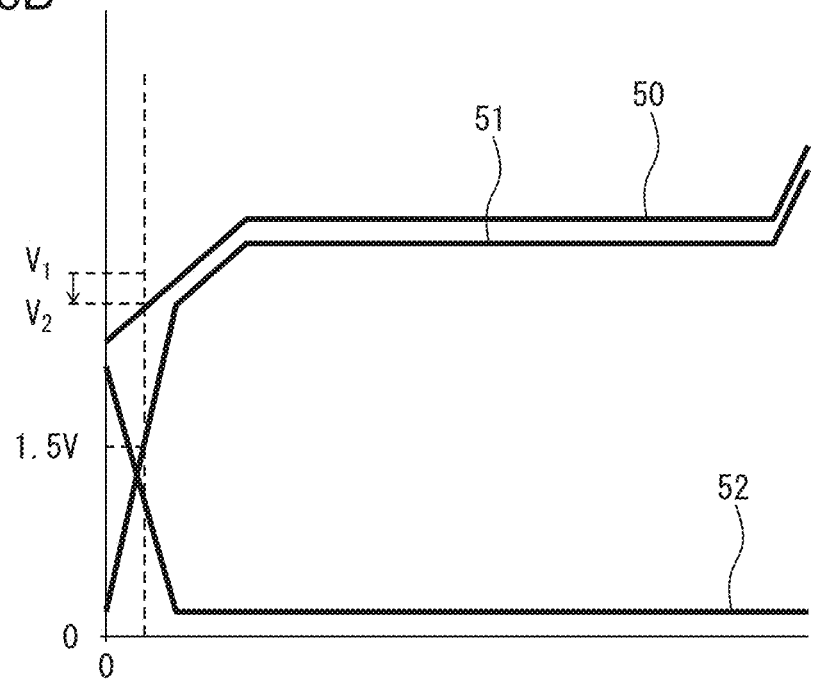
FIG. 6B depicts a graph representing the changes in electrical potential and battery voltage of a positive electrode active material layer and a negative electrode active material layer.

The graph of FIG. 6B represents changes in an electrical potential (50) of a positive electrode active material layer, an electrical potential (52) of a negative electrode active material layer, and a battery voltage (51) when an all-solid-state battery in which the capacity of the negative electrode active material layer is lower than the capacity of the positive electrode active material layer has been discharged. In FIG. 6B, V$_2$ represents the electrical potential (50) of the positive electrode active material layer when the battery voltage (51) was discharged to a prescribed voltage. In addition, V$_1$ represents the electrical potential (50) of the positive electrode active material layer when the battery voltage (51) was discharged to a prescribed voltage in FIG. 6A.

As shown in FIGS. 6A and 6B, in the case the capacity of the negative electrode active material layer is lower than the capacity of the positive electrode active material layer (FIG. 6B), the point at which the electrical potential of the negative electrode active material layer begins to rise during discharge is later than in the case the capacity of the negative electrode active material layer is higher than the capacity of the positive electrode active material layer. This is because, since the amount of lithium ions retained per unit weight of the negative electrode active material is greater in the case the capacity of the negative electrode active material layer is lower than the capacity of the positive electrode active material layer (FIG. 6B) than in the case the capacity of the negative electrode active material layer is higher than the capacity of the positive electrode active material layer (FIG. 6A), the electrical potential does not rise unless a larger number of lithium ions are released by the negative electrode active material layer.

In this manner, the point at which the electrical potential of the negative electrode active material layer begins to rise is later if the capacity of the negative electrode active material layer is lower than the capacity of the positive electrode active material layer (FIG. 6B). Consequently, the electrical potential of the positive electrode active material layer when the battery voltage is a prescribed voltage is lower than in the case the capacity of the negative electrode active material layer is higher than the capacity of the positive electrode active material layer (FIG. 6A).

Thus, in comparison with the case of the ratio of the capacity of the negative electrode active material layer to the capacity of the positive electrode active material layer being large (FIG. 6A), in the case the ratio of the capacity of the negative electrode active material layer to the capacity of the positive electrode active material layer is small (FIG. 6B), the amount of time until the electrical potential of the positive electrode active material layer reaches 2.1 V (vs. Li/Li$^+$) or less during battery discharge can be increased and the electrical potential can be lowered to a lower potential, thereby making it possible to increase the number of reactions in which the resistive layer is destroyed. As a result, battery capacity can be further increased and battery internal resistance can be further decreased.

Furthermore, it should be understood that the capacity of the negative electrode active material layer of an all-solid-state battery is conventionally typically higher than the capacity of the positive electrode active material layer. This is because, if the capacity of the negative electrode active material layer is lower than the capacity of the positive electrode active material layer, the amount of lithium ions released from the positive electrode active material layer during charging becomes greater than the amount of lithium ions able to be accepted by the negative electrode active material layer, thereby lithium ions may deposit on the negative electrode active material layer.

Furthermore, the all-solid-state battery system of the present disclosure is particularly effective when applied to an all-solid-state battery in which the positive electrode active material layer has been fabricated by slurry coating.

However, resistance of the all-solid-state battery can be decreased and battery capacity can be increased even in the case of using an all-solid-state battery in which the positive electrode active material layer has been fabricated by another method. Thus, the all-solid-state battery system of the present disclosure is not limited to that which uses an all-solid-state battery in which the positive electrode active material layer has been fabricated by slurry coating.

<All-Solid-State Battery System>

The all-solid-state battery system of the present disclosure has an all-solid-state battery and a control device that controls the lower limit discharge potential of the positive electrode active material layer of the all-solid-state battery.

<All-Solid-State Battery>

The all-solid-state battery has a positive electrode active material layer, a solid electrolyte layer and a negative electrode active material layer. In addition, the positive electrode active material layer and/or the solid electrolyte layer have a sulfide solid electrolyte.

<Positive Electrode Active Material Layer>

The positive electrode active material layer of the present disclosure has a positive electrode active material and optionally a sulfide solid electrolyte, a conductive assistant and a binder.

1. Positive Electrode Active Material

In the present disclosure, an olivine-type positive electrode material ($Li_xM_yPO_z$, wherein, M represents Fe, Mn, Co and Ni, x is such that $0.5 \leq x \leq 1.5$, y is such that $0.5 \leq y \leq 1.5$ and z is such that $2 \leq z \leq 7$) is used for the positive electrode active material. In particular, $LiFePO_4$ may be used for the olivine-type positive electrode active material since it has high material stability and has a large theoretical capacity.

2. Sulfide Solid Electrolyte

A sulfide solid electrolyte used as a solid electrolyte of all-solid-state batteries can be used for the solid electrolyte. Examples thereof include $Li_2S$—$SiS_2$, $LiX$—$Li_2S$—$SiS_2$, $LiX$—$Li_2S$—$P_2S_5$, $LiX$—$Li_2S$—$P_2S_5$, $LiX$—$Li_2S$—$Li_2O$—$P_2S_5$ and $Li_2S$—$P_2S_5$. Incidentally, "X" represents a halogen, and particularly I or Br.

3. Conductive Assistant

Examples of conductive assistants include carbon materials such as vapor-grown carbon fibers (VGCF), acetylene black, Ketjen black, carbon nanotubes (CNT) or carbon nanofibers (CNF), metals such as nickel-aluminum-stainless steel, and combinations thereof.

4. Binder

Examples of binders include, but are not limited to, polymer resins such as polyvinylidene fluoride (PVDF), polytetrafluoroethylene (PTFE), polyimide (PI), polyamide (PA), polyamide-imide (PAI), butadiene rubber (BR), styrene butadiene rubber (SBR), nitrile butadiene rubber (NBR), styrene-ethylene-butylene-styrene block copolymer (SEBS), carboxymethyl cellulose (CMC) and combinations thereof.

<Solid State Electrolyte Layer>

The solid electrolyte layer has a solid electrolyte and optionally has a binder. The same solid electrolytes and binders described with respect to the positive electrode active material layer can be used for the solid electrolyte and binder. Furthermore, if a sulfide solid electrolyte is used in the positive electrode active material layer, a solid electrolyte other than a sulfide solid electrolyte may be used.

<Negative Electrode Active Material Layer>

The negative electrode active material layer has a negative electrode active material and optionally has a solid electrolyte, conductive assistant and binder.

There are no particular limitations on the negative electrode active material used in the negative electrode active material layer provided it is able to occlude and release lithium ions. Specific examples of negative electrode active materials include metals such as Li, Sn, Si or In, alloys of Li and Ti, Mg or Al, carbon materials such as hard carbon, soft carbon or graphite, and combinations thereof. In particular, lithium titanate (LTO) and lithium-containing alloys may be used from the viewpoints of cycling characteristics and discharge characteristics.

The same solid electrolytes, conductive assistants and binders described with respect to the positive electrode active material layer can be used for the solid electrolyte, conductive assistant and binder.

<Capacity Ratio Between Negative Electrode Active Material Layer and Positive Electrode Active Material Layer>

In the present disclosure, the capacity of the negative electrode active material layer is lower than the capacity of the positive electrode active material layer, and the ratio of the capacity of the negative electrode active material layer to the capacity of the positive electrode active material layer may be 0.95 or less. This is because the electrical potential of the positive electrode active material layer decreases more during discharge of the all-solid-state battery if the capacity of the negative electrode active material is lower than the capacity of the positive electrode active material.

The ratio of the capacity of the negative electrode active material layer to the capacity of the positive electrode active material layer (capacity of negative electrode active material layer/capacity of positive electrode active material layer) may be 0.95 or less, 0.90 or less, 0.80 or less or 0.70 or less and 0.50 or more, 0.56 or more, 0.60 or more or 0.65 or more.

Incidentally, in the present disclosure, "capacity" refers to the charging capacities of the positive electrode active material layer and negative electrode active material layer, and substantially represents the amount of lithium ions able to be accepted by the positive electrode active material layer and negative electrode active material layer.

<Control Device>

The control device controls the lower limit discharge potential of the positive electrode active material layer during normal use of the all-solid-state battery to 1.6 V (vs. Li/Li$^+$) to 2.1 V (vs. Li/Li$^+$). There are no particular limitations on the control device provided it is able to control the lower limit discharge potential of the positive electrode active material layer. For example, the control device may have a function that judges whether the lower limit discharge potential of the positive electrode active material layer has reached a certain electrical potential during discharge of the all-solid-state battery, and terminates discharge in the case of having reached a certain electrical potential. Furthermore, normal use of the all-solid-state battery refers to when the battery is used as a product.

In the present disclosure, the lower limit discharge potential of the positive electrode active material layer during normal use of the battery is 1.6 V (vs. Li/Li$^+$) to 2.1 V (vs. Li/Li$^+$). This is because, by making the lower limit discharge potential of the positive electrode active material layer to be 2.1 V (vs. Li/Li$^+$) or less, the reaction that leads to destruction of the resistive layer is allowed to proceed, while on the other hand, when the battery is discharged until the electrical potential of the positive electrode active material layer reaches a certain value or lower, the material of the positive electrode active material layer reacts due to over-discharge and the positive electrode active material layer deteriorates.

The lower limit discharge potential of the positive electrode active material layer may be 2.1 V (vs. Li/Li$^+$) or less, 2.0 V (vs. Li/Li$^+$) or less or 1.9 V (vs. Li/Li$^+$) or less and 1.6 V (vs. Li/Li$^+$) or more, 1.7 V (vs. Li/Li$^+$) or more or 1.8 V (vs. Li/Li$^+$) or more.

The all-solid-state battery system of the present disclosure may be used under the following temperature conditions. In addition, the control device may further control the charge-discharge rate and/or upper limit charging potential during normal use of the all-solid-state battery.

1. Temperature

The temperature of the all-solid-state battery system of the present disclosure during normal use of the battery may be 25° C. to 80° C. As a result of making the temperature of the all-solid-state battery to be within a certain range during charge-discharge cycling, the reaction for destroying the resistive layer formed between the olivine-type positive electrode active material and solid electrolyte during charging can be allowed to proceed efficiently. In addition, in the case the temperature is excessively low, the reaction for destroying the resistive layer does not proceed adequately and it becomes necessary to repeat charge-discharge cycling an extremely large number of times, thereby resulting in poor efficiency. Conversely, in the case the temperature is excessively high, other side reactions proceed resulting in deterioration of the positive electrode active material.

The temperature range may be 25° C. or higher, 35° C. or higher, 40° C. or higher, 45° C. or higher or 50° C. or higher and 80° C. or lower, 75° C. or lower, 70° C. or lower, 65° C. or lower, 60° C. or lower or 55° C. or lower. The temperature may be 42° C. to 60° C. in order to reduce side reactions while allowing the reaction for destroying the resistive layer to proceed.

2. Charge-Discharge Rate

The control device may control the charge-discharge rate during normal use of the solid-state-battery to 1.0 C or lower. In the case the charge-discharge rate is excessively high, since there is little reaction for destroying the resistive layer, the charge-discharge cycling is required to be repeated for an extremely large number of times. Conversely, by making the charge-discharge rate low, the number of charge-discharge cycles required to remove the resistive layer can be reduced.

The charge-discharge rate may be 1.0 C or less, 0.7 C or less, 0.5 C or less, 0.1 C or less, 0.05 C or less or 0.02 C or less.

When charge-discharge rate is high, the number of charge-discharge cycles required until the resistive layer is destroyed increases. On the other hand, if the rate is low, a single cycle requires considerable time. Thus, the discharge-discharge rate may be 0.1 C to 0.5 C based on the balance between the required number of charge-discharge cycles and the amount of time required for a single cycle.

3. Upper Limit Voltage

The control device may control the electrical potential of the positive electrode active material layer during normal use of the all-solid-state battery so that the battery is charged to an upper limit charging potential of 3.8 V (vs. Li/Li$^+$) to 4.4 V (vs. Li/Li$^+$). This is because, if the upper limit charging potential is excessively high, side reactions end up proceeding and the positive electrode active material deteriorates.

The upper limit charging potential may be 3.8 V (vs. Li/Li$^+$) or higher, 4.0 V (vs. Li/Li$^+$) or higher or 4.1 V (vs. Li/Li$^+$) or higher, and 4.4 V (vs. Li/Li$^+$) or lower, 4.3 V (vs. Li/Li$^+$) or lower or 4.2 V (vs. Li/Li$^+$) or lower.

<<Method for Producing all-Solid-State Battery of the Present Disclosure>>

The production method of the present disclosure for producing an all-solid-state battery is a method for producing an all-solid-state battery that has a positive electrode active material layer, a solid electrolyte layer and a negative electrode active material layer. Here, the positive electrode active material layer and/or solid electrolyte layer have a sulfide solid electrolyte. In addition, the positive electrode active material layer has an olivine-type positive electrode active material ($Li_xM_yPO_z$, wherein, M represents Fe, Mn, Co and Ni, x is such that 0.5≤x≤1.5, y is such that 0.5≤y≤1.5 and z is such that 2≤z≤7). In addition, the capacity of the negative electrode active material layer is lower than the capacity of the positive electrode active material layer. In addition, the production method of the present disclosure comprises carrying out charge-discharge cycling in which the positive electrode active material layer is discharged to 1.6 V (vs. Li/Li$^+$) to 2.1 V (vs. Li/Li$^+$).

The same positive electrode active material layer, solid electrolyte layer and negative electrode active material layer described in the aforementioned section entitled <<All-Solid-State Battery System of the Present Disclosure>> can be used for the positive electrode active material layer, solid electrolyte layer and negative electrode active material layer used in the method for producing an all-solid-state battery of the present disclosure.

In the method for producing an all-solid-state battery of the present disclosure, after having assembled the all-solid-state battery by laminating the positive electrode active material layer, the solid electrolyte layer and the negative electrode active material layer, charge-discharge cycling is carried out consisting of discharging the positive electrode active material layer to 1.6 V (vs. Li/Li$^+$) to 2.1 V (vs. Li/Li$^+$) while maintaining the temperature of the all-solid-state battery at 25° C. to 80° C.

Charge-discharge cycling in the method for producing an all-solid-state battery of the present disclosure may be carried out under the same conditions for upper limit charging potential, charge-discharge rate and battery temperature as those described in the aforementioned section entitled <<All-Solid-State Battery System of the Present Disclosure>>.

EXAMPLES

Examples 1 to 8 and Reference Examples 1 to 17

All-solid-state batteries of Examples 1 to 8 and Reference Examples 1 to 17 were fabricated according to the methods described below, and charge-discharge cycling was carried out under the conditions indicated below followed by evaluation of the internal resistance thereof.

Example 1

1. All-Solid-State Battery Assembly Step (1) Fabrication of Positive Electrode Active Material Layer LiFePO$_4$ as a positive electrode active material and Li$_2$S—P$_2$S$_5$ as a sulfide solid electrolyte were mixed at a volume ratio of 50:50, and polyvinylidene fluoride (PVDF) as a binder and vapor-grown carbon fibers (VGCF) as a conductive assistant were respectively mixed at 5% by weight based on LiFePO$_4$ followed by dispersing in butyl butyrate as a dispersion medium to fabricate a slurry for the positive electrode active material layer.

The slurry for the positive electrode active material layer was coated onto aluminum foil as a positive electrode current collector by doctor blade coating followed by drying to fabricate the positive electrode active material layer.

(2) Fabrication of Negative Electrode Active Material Layer

Natural graphite as a negative electrode active material and $Li_2S$—$P_2S_5$ as a sulfide solid electrolyte were mixed at a volume ratio of 50:50, and PVDF as a binder in was mixed at 5% by weight based on the natural graphite followed by dispersing in butyl butyrate as a dispersion medium to fabricate a slurry for the negative electrode active material layer.

The slurry for the negative electrode active material layer was coated onto copper foil as a negative electrode current collector by doctor blade coating followed by drying to fabricate the negative electrode active material layer.

(3) Fabrication of Sulfide Solid Electrolyte Layer $Li_2S$—$P_2S_5$ as a sulfide solid electrolyte and polyvinylidene fluoride (PVDF) as a binder were mixed at a volume ratio of 90:10 followed by dispersing in dehydrated heptane as a dispersion medium to fabricate a slurry for the sulfide solid electrolyte layer.

The slurry for the sulfide solid electrolyte layer was coated onto aluminum foil by doctor blade coating and dried. The aluminum foil was subsequently peeled off to fabricate a sulfide solid electrolyte layer.

(4) Assembly of all-Solid-State Battery

The fabricated positive electrode active material layer, negative electrode active material layer and solid electrolyte layer were fabricated in the order of the positive electrode active material layer, sulfide solid electrolyte layer and negative electrode active material layer to fabricate the all-solid-state battery of Example 1.

Furthermore, the ratio of the capacity of the negative electrode active material layer to the capacity of the positive electrode active material layer (capacity of negative electrode active material layer/capacity of positive electrode active material layer) of the all-solid-state battery of Example 1 is as shown in Table 1.

Examples 2 to 8 and Reference Examples 1 to 17

All-solid-state batteries of Examples 2 to 8 and Reference Examples 1 to 17 were fabricated with the exception of changing the ratio of the capacity of the negative electrode active material layer to the capacity of the positive electrode active material layer. Furthermore, this ratio was changed by adjusting the height of the blade relative to the copper foil when coating the negative electrode active material layer.

The ratios of the capacity of the negative electrode active material layer to the capacity of the positive electrode active material layer (capacity of negative electrode active material layer/capacity of positive electrode active material layer) of the all-solid-state batteries of Examples 2 to 8 and Reference Examples 1 to 17 are as shown in Table 1.

<Battery Evaluation>

Twenty cycles of charging and discharging were carried out on the batteries of Examples 2 to 18 and Reference Examples 1 to 17 within a voltage range of 1.5 V to 4.0 V while maintaining battery temperature at 60° C. Subsequently, the state of charge (SOC) was aligned at 60%, the batteries were discharged for 10 seconds at a rate of 3 C, and battery resistance was evaluated based on overvoltage during this discharge.

TABLE 1

|  | Capacity Ratio | Resistance (Ω) |
| --- | --- | --- |
| Example 1 | 0.56 | 39.5 |
| Example 2 | 0.66 | 72.3 |
| Example 3 | 0.73 | 57 |
| Example 4 | 0.74 | 112.4 |
| Example 5 | 0.78 | 114 |
| Example 7 | 0.80 | 82 |
| Example 8 | 0.95 | 92 |
| Reference Example 1 | 1.03 | 136.5 |
| Reference Example 2 | 1.11 | 178 |
| Reference Example 3 | 1.15 | 114.7 |
| Reference Example 4 | 1.19 | 129 |
| Reference Example 5 | 1.19 | 146 |
| Reference Example 6 | 1.21 | 162 |
| Reference Example 7 | 1.23 | 121.8 |
| Reference Example 8 | 1.24 | 215 |
| Reference Example 9 | 1.24 | 248.3 |
| Reference Example 10 | 1.25 | 179 |
| Reference Example 11 | 1.30 | 121 |
| Reference Example 12 | 1.33 | 203.8 |
| Reference Example 13 | 1.37 | 186 |
| Reference Example 14 | 1.45 | 235 |
| Reference Example 15 | 1.58 | 90 |
| Reference Example 16 | 1.62 | 66.3 |
| Reference Example 17 | 1.77 | 156 |

In the above table, "capacity ratio" refers to the ratio of the capacity of the negative electrode active material layer to the capacity of the positive electrode active material layer. In addition, "resistance" refers to the internal resistance of the battery.

<Results and Discussion>

FIG. 7 is a graph representing the relationship between "capacity ratio" and "resistance" for the all-solid-state batteries of Examples 1 to 8 and Reference Examples 1 to 17.

In the all-solid-state batteries of Examples 1 to 8, "capacity ratio" was less than 1. In the all-solid-state batteries of Examples 1 to 8, all values for "resistance" were lower in comparison with the all-solid-state batteries of Reference Examples 1 to 17. Thus, if the ratio of the capacity of the negative electrode active material layer to the capacity of the positive electrode active material layer is less than 1, battery internal resistance is lowered by repeating charge-discharge cycling.

This is thought to be because, in the all-solid-state batteries of Examples 1 to 8, the resistance layer formed at the interface between the $LiFePO_4$ as a positive electrode active material and the sulfide solid electrolyte was destroyed as a result of repeating charge-discharge cycling under certain conditions, thereby decreasing battery internal resistance.

Comparative Examples 1 to 4

Solution-based batteries of Comparative Examples 1 to 4 were fabricated in the manner described below followed by carrying out charge-discharge cycling under the conditions indicated below and evaluation of the internal resistance thereof.

Comparative Example 1

$LiFePO_4$ as a positive electrode active material, PVDF as a binder and VGCF as a conductive assistant were mixed at a volume ratio of 80:10:10 to fabricate a positive electrode active material layer.

In addition, natural graphite as a negative electrode active material and PVDF as a binder were mixed at a volume ratio of 90:10 to fabricate a negative electrode active material layer.

LiPF$_6$ as an electrolyte was dissolved in ethylene carbonate (EC) and diethyl carbonate (DEC) as organic solvents to produce an electrolytic solution.

A laminate of polyethylene and polypropylene as a separator and the aforementioned positive electrode active material layer, negative electrode active material layer and electrolytic solution were used to fabricate the battery of Comparative Example 1.

Comparative Examples 2 to 4

Batteries of Comparative Examples 2 to 4 were fabricated in the same manner as Comparative Example 1 with the exception of changing the capacity ratio between the positive electrode active material layer and negative electrode active material layer.

Furthermore, the capacity ratios between the positive electrode active material layer and negative electrode active material layer in Comparative Examples 1 to 4 are as shown in the following Table 2.

<Battery Evaluation>

Three cycles of charging and discharging were carried out on the batteries of Comparative Examples 1 to 4 within a voltage range of 1.5 V to 4.0 V while maintaining battery temperature at 25° C. Subsequently, the state of charge (SOC) was aligned at 60%, the batteries were discharged for 10 seconds at a rate of 3 C, and battery resistance was evaluated based on overvoltage during this discharge.

Battery resistance of the batteries of Comparative Examples 1 to 4 is as shown in Table 2.

TABLE 2

| | Capacity Ratio | Resistance (Ω) |
|---|---|---|
| Comparative Example 1 | 0.5 | 16.8 |
| Comparative Example 2 | 0.7 | 17.1 |
| Comparative Example 3 | 1 | 17.3 |
| Comparative Example 4 | 1.5 | 16.9 |

In the above table, "capacity ratio" refers to the ratio of the capacity of the negative electrode active material layer to the capacity of the positive electrode active material layer. In addition, "resistance" refers to the internal resistance of the battery.

<Results and Discussion>

As shown in Table 2, if a solution-based batteries use LiFePO$_4$ for the positive electrode active material, battery resistance was nearly the same regardless of differences in the capacity ratio between the positive electrode active material layer and negative electrode active material layer.

On the basis thereof, the phenomenon of battery internal resistance decreasing as a result of repeating charge-discharge cycling if the capacity ratio of the negative electrode active material to the positive electrode active material is lower than 1 can be said to not occur in solution-based batteries. Thus, this phenomenon is thought to be unique to all-solid-state batteries using LiFePO$_4$ and a sulfide solid electrolyte.

Reference Examples 18 to 34

All-solid-state batteries were fabricated in the manner indicated below and charge-discharge cycling was further repeated under certain conditions.

<Fabrication of all-Solid-State Batteries>

1. Fabrication of Powder for Positive Electrode Active Material Layer

LiFePO$_4$ having a carbon coating as a positive electrode active material, vapor-grown carbon fibers (VGCF) as a conductivity assistant, Li$_3$PS$_4$—LiI—LiBr as a sulfide solid electrolyte, butyl butyrate as a dispersion medium, and vinylidene fluoride (PVDF) as a binder were weighed out and mixed well to fabricate a slurry for the positive electrode active material layer. This slurry for the positive electrode active material layer was coated onto aluminum foil and dried to obtain a powder for the positive electrode active material layer.

2. Fabrication of Powder for Negative Electrode Active Material Layer

Li$_4$Ti$_5$O$_{12}$ (LTO) as a negative electrode active material, VGCF as a conductive assistant, Li$_3$PS$_4$—LiI—LiBr as a sulfide solid electrolyte, butyl butyrate as a dispersion medium, and PVDF as a binder were weighed out and mixed well to fabricate a slurry for the negative electrode active material layer. This slurry for the negative electrode active material layer was coated onto aluminum foil and dried to obtain a powder for the negative electrode active material layer.

3. Fabrication of Solid Electrolyte Layer

Sulfide solid electrolyte, binder and dehydrated heptane as dispersion medium were mixed well to fabricate a slurry for the solid electrolyte layer. This slurry for the solid electrolyte layer was coated onto aluminum foil and dried to obtain a solid electrolyte layer.

4. Battery Assembly

The solid electrolyte layer was pressed followed by placing a prescribed weighed amount of the powder for the positive electrode active material layer thereon and pressing to form the positive electrode active material layer. A prescribed amount of the powder for the negative electrode active material layer was weighed out and pressed to form the negative electrode active material layer. The negative electrode active material layer was then laminated on the solid electrolyte layer of the positive electrode active material layer followed by assembling into an all-solid-state battery by binding together with a jig.

<Charge-Discharge Cycling>

Charge-discharge cycling was repeated on the all-solid-state batteries fabricated according to the aforementioned method under the conditions for the lower limit of the electrical potential of the positive electrode active material layer during discharge (herein after referred to as "lower limit discharge potential"), upper limit of the electrical potential of the positive electrode active material layer during charging (herein after referred to as "upper limit charging potential"), charge-discharge rate and temperature shown in the following Table 3. The relationships between battery voltage, battery capacity and discharge capacity during charge-discharge cycling were measured. In the following table, discharge capacity is indicated as battery capacity.

TABLE 3

Table 1

| | Production Conditions | | | | Results | | |
|---|---|---|---|---|---|---|---|
| | Lower Limit Discharge Potential (V (vs. Li/Li⁺)) | Upper Limit Charging Potential (V (vs. Li/Li⁺)) | Charge-discharge Rate (C) | Temperature (° C.) | Final Discharge Capacity (mAh/g) | Effect | FIG. |
| Reference Example 18 | 1.6 | 4.1 | 0.1 | 60 | 175 | OK | 11A |
| Reference Example 19 | 2.1 | 4.1 | 0.1 | 60 | 155 | OK | 11B |
| Reference Example 20 | 2.3 | 4.1 | 0.1 | 60 | 10 | NG | 11C |
| Reference Example 21 | 1.6 | 3.8 | 0.1 | 60 | 168 | OK | 10A |
| Reference Example 22 | 1.6 | 4.1 | 0.1 | 60 | 175 | OK | 10B |
| Reference Example 23 | 1.6 | 4.4 | 0.1 | 60 | 175 | OK | 10C |
| Reference Example 24 | 1.6 | 4.7 | 0.1 | 60 | 205 | C/P[1] | 10D |
| Reference Example 25 | 1.6 | 4.1 | 0.02 | 60 | 175 | OK | 9A |
| Reference Example 26 | 1.6 | 4.1 | 0.05 | 60 | 168 | OK | 9B |
| Reference Example 27 | 1.6 | 4.1 | 0.1 | 60 | 175 | OK | 9C |
| Reference Example 28 | 1.6 | 4.1 | 0.5 | 60 | 160 | OK | 9D |
| Reference Example 29 | 1.6 | 4.1 | 1 | 60 | 145 | OK | 9E |
| Reference Example 30 | 1.6 | 4.1 | 0.1 | 25 | 138 | C/P | 8A |
| Reference Example 31 | 1.6 | 4.1 | 0.1 | 42 | 165 | OK | 8B |
| Reference Example 32 | 1.6 | 4.1 | 0.1 | 60 | 175 | OK | 8C |
| Reference Example 33 | 1.6 | 4.1 | 0.1 | 80 | 110 | OK | 8D |
| Reference Example 34 | 1.6 | 4.1 | 0.1 | 100 | 25 | NG | 8E |

[1]C/P: Conditionally Passed

1. Explanation of Table

As shown in Table 3, Reference Examples 18 to 20 indicate cases in which charge-discharge cycling was repeated while changing only the lower limit discharge potential while holding temperature, charge-discharge rate and upper limit charging potential constant. In addition, Reference Examples 21 to 24 indicate cases in which charge-discharge cycling was repeated while changing only the upper limit charging potential and holding temperature, charge-discharge rate and lower limit discharge potential constant. In addition, Reference Examples 25 to 29 indicate cases in which charge-discharge cycling was repeated while changing only the charge-discharge rate while holding temperature, upper limit charging potential and lower limit discharge potential constant. In addition, Reference Examples 30 to 34 indicate cases in which charge-discharge cycling was repeated while changing only the temperature while holding charge-discharge rate, upper limit charging potential and lower limit discharge potential constant.

In addition, in Table 3, "Effect" refers to an assessment of whether or not discharge capacity increased as a result of repeating charge-discharge cycling. A "OK" in the "Effect" column indicates the case in which discharge capacity was able to be increased, while a "NG" mark indicates the case in which discharge capacity was unable to be increased. In addition, a "C/P" mark indicates the case in which, although discharge capacity increased as a result of repeating charge-discharge cycling, there were an excessively large number of side reactions (Reference Example 24), or discharge capacity was unable to be adequately increased unless charge/discharge cycling was carried out for an extremely large number of cycles (Reference Example 30).

In addition, in Table 3, "Figure" indicates Figures representing the relationship between battery voltage, charging capacity and battery capacity in the case of having repeated charge-discharge cycling according to each condition. In FIGS. 8A to 11C, voltage is described as the electrical potential with respect to the electrical potential of the reaction between LTO and lithium ions in the case of using LTO for the negative electrode active material (V (vs. LTO)).

In contrast, in the present description, it should be understood that voltage is described as the electrical potential with respect to the deposition voltage of lithium metal (V (vs. Li/Li⁺)). The electrical potential of the reaction between LTO and lithium ions (V (vs. LTO)) can be converted to the electrical potential with respect to the deposition potential of lithium metal (V (vs. Li/Li⁺)) by adding a voltage of 1.6 V. In FIGS. 8A to 11C, the electrical potential with respect to the deposition potential of lithium metal (V (vs. Li/Li⁺)) is described in parentheses below the electrical potential (V (vs. Li/Li⁺)) with respect to the electrical potential of the reaction between LTO and lithium ions (V (vs. LTO)). Furthermore, in FIGS. 8A to 11C, battery capacity is the capacity per unit weight of the positive electrode active material.

2. Results (1) Lower Limit Discharge Potential (Reference Examples 18 to 20)

With respect to Reference Examples 18 to 20, charge-discharge cycling was repeated while maintaining the lower limit discharge potential of the all-solid-state batteries at 1.6 V (vs. Li/Li⁺), 2.1 V (vs. Li/Li⁺) and 2.3 V (vs. Li/Li⁺), respectively. As a result, with respect to Reference Examples 18 and 19, although battery capacity decreased during the first few cycles, as a result of subsequently further repeating charging and discharging for up to 20 cycles, all-solid-state batteries having a large battery capacity were able to be obtained. In contrast, in Reference Example 20, battery voltage did not increase despite repeating charge-discharge cycling, and an all-solid-state battery having a large battery capacity was unable to be obtained.

In FIGS. 11A and 11B, reaction plateaus are sufficiently present at 2.1 V (vs. Li/Li⁺) to 2.5 V (vs. Li/Li⁺). In contrast, in FIG. 11C, although a reaction plateau is observed at 2.1 V (vs. Li/Li⁺) to 2.5 V (vs. Li/Li⁺), discharge ends partway through the reaction plateau. This is thought to indicate that, in contrast to the resistive layer having been adequately destroyed in in Reference Examples 18 and 19, in which the all-solid-state batteries discharged to a voltage lower than the electrical potential of 2.1 V (vs. Li/Li$^+$) to 2.5 V (vs. Li/Li$^+$) of the reaction between lithium ions and the resistive layer in the form of iron sulfide, the resistive layer was not sufficiently destroyed in Reference Example 20, in which the all-solid-state battery only discharged to 2.3 V.

(2) Upper Limit Charging Potential (Reference Examples 21 to 24)

With respect to Reference Examples 21 to 24, charge-discharge cycling was repeated for the fabricated all-solid-state batteries at an upper limit charging potential of 3.8 V (vs. Li/Li$^+$), 4.1 V (vs. Li/Li$^+$), 4.4 V (vs. Li/Li$^+$) and 4.7 V (vs. Li/Li$^+$), respectively. As a result, when charge-discharge cycling has been carried out in Examples 21 to 23, namely at an upper limit charging potential of 3.8 V (vs. Li/Li$^+$) to 4.4 V (vs. Li/Li$^+$), all-solid-state batteries were obtained having battery capacity of 160 mAh/g to 175 mAh/g that approached the theoretical capacity of LiFePO$_4$. In contrast, in the case of having repeated charge-discharge cycling at 4.7 V (vs. Li/Li$^+$) in the manner of Reference Example 24, the battery capacity of 200 mAh/g was larger than the theoretical capacity of LiFePO$_4$.

Figure 10A:
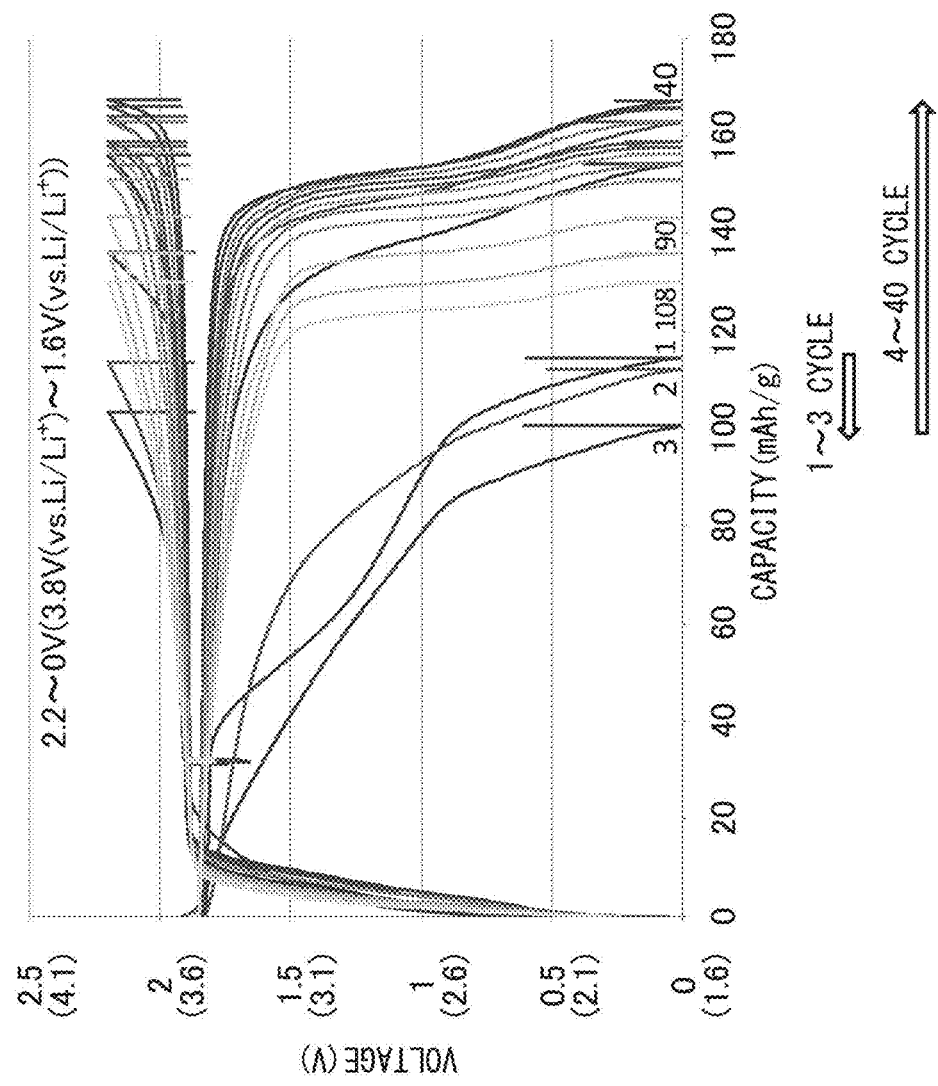
FIG. 10A is a graph representing the relationship between voltage and battery capacity when charge-discharge cycling has been repeated while maintaining the upper limit charging potential of a positive electrode active material layer at 3.8 V (vs. Li/Li$^+$).

In Reference Examples 21 to 23 in which charge-discharge cycling was carried out at an upper limit charging potential of 3.8 V (vs. Li/Li$^+$) to 4.4 V (vs. Li/Li$^+$) as shown in FIGS. 10A to 10C, battery capacity decreased during the first several cycles, and potential plateaus appeared in the vicinity of 2.1 V (vs. Li/Li$^+$) to 2.5 V (vs. Li/Li$^+$). Subsequently, as a result of repeating charge-discharge cycling, the potential plateaus in the vicinity of 2.1 V (vs. Li/Li$^+$) to 2.5 V (vs. Li/Li$^+$) were no longer observed, potential plateaus appeared at 3.3 V (vs. Li/Li$^+$) to 3.5 V (vs. Li/Li$^+$), and battery capacity increased. When a comparison is made among FIGS. 10A to 10C, as the upper limit charging potential became higher, there was an increase in the number of charge-discharge cycles required until the appearance of a potential plateau at 3.3 V (vs. Li/Li$^+$) to 3.5 V (vs. Li/Li$^+$). This is thought to be due to side reactions occurring more significantly as the upper limit potential became higher.

In the Reference Example 24, in which charge-discharge cycling was carried out at an upper limit charging potential of 4.7 V (vs. Li/Li$^+$) as shown in FIG. 10D, battery capacity decreased during the first several cycles and battery capacity increased as a result of subsequently repeating charge-discharge cycling in the same manner as Reference Examples 21 to 23. However, battery capacity was greater than the theoretical capacity of LiFePO$_4$ after 20 cycles. In addition, the potential plateau at 3.3 V (vs. Li/Li$^+$) to 3.5 V (vs. Li/Li$^+$) was shorter. This indicates that numerous side reactions were occurring in Reference Example 24.

(3) Charge-Discharge Rate (Reference Examples 25 to 29)

In Reference Examples 25 to 29, fabricated all-solid-state batteries were repeatedly subjected to charge-discharge cycling while maintaining a charge-discharge rate of 0.02 C, 0.05 C, 0.1 C. 0.5 C or 1.0 C, respectively. As a result, large battery capacities were obtained in all cases. In the case of a charge-discharge rate of 0.5 C or less in particular, namely in Reference Examples 25 to 28, all-solid-state batteries were obtained that had battery capacity of 160 mAh/g to 170 mAh/g, closely approximately the theoretical capacity of LiFePO$_4$. When charge-discharge cycling has been carried out at a charge-discharge rate of 1.0 C, namely in Reference Example 29, a larger number of charge-discharge cycles was required in comparison with the other cases. However, an all-solid-state battery was able to be obtained that had high battery capacity of about 145 mAh/g.

As shown in FIGS. 9B to 9D, in Reference Examples 26 to 28, in which charge-discharge cycling was repeated at 0.05 C, 0.1 C and 0.5 C respectively, potential plateaus appeared at 2.1 V (vs. Li/Li$^+$) to 2.5 V (vs. Li/Li$^+$) during the first several cycles of discharging, and as a result of subsequently repeating cycling, potential plateaus in the vicinity of 2.1 V (vs. Li/Li$^+$) to 2.5 V (vs. Li/Li$^+$) were no longer observed, and potential plateaus appeared at 3.3 V (vs. Li/Li$^+$) to 3.5 V (vs. Li/Li$^+$).

In Reference Examples 26 to 28, this is thought to be due to the resistive layer composed of ion sulfide formed during initial charging having been destroyed by reacting with lithium ions during the first several cycles, followed by the resistive layer being separated from the interface between the positive electrode active material and sulfide solid electrolyte as a result of subsequent charge-discharge cycling, thereby allowing the positive electrode active material to adequately react with lithium ions.

In addition, as shown in FIG. 9E, in Reference Example 25, in which charge-discharge cycling was repeated at a charge-discharge rate of 1.0 C, a potential plateau appeared at 2.1 V (vs. Li/Li$^+$) to 2.5 V (vs. Li/Li$^+$) during the first several cycles. However, this potential plateau at 2.1 V (vs. Li/Li$^+$) to 2.5 V (vs. Li/Li$^+$) did not disappear even after having repeated charge-discharge cycling numerous times, and battery capacity continued to decrease even after having repeated charge-discharge cycling for 14 cycles. When charge-discharge cycling was further repeated, battery capacity gradually rose, the potential plateau in the vicinity of 2.1 V (vs. Li/Li$^+$) to 2.5 V (vs. Li/Li$^+$) was no longer observed, and a potential plateau began to appear at 3.3 V (vs. Li/Li$^+$) to 3.5 V (vs. Li/Li$^+$)).

Finally, battery capacity stabilized after charge-discharge cycling had been repeated for 81 cycles. This is thought to be due to the short duration of discharge due to the excessively high charge-discharge rate, and since there was therefore little reaction between the resistive layer and lithium ions during a single cycle, the resistance layer was destroyed over the course of a larger number of charge-discharge cycles in comparison with the case of a lower charge-discharge rate.

Figure 9A:
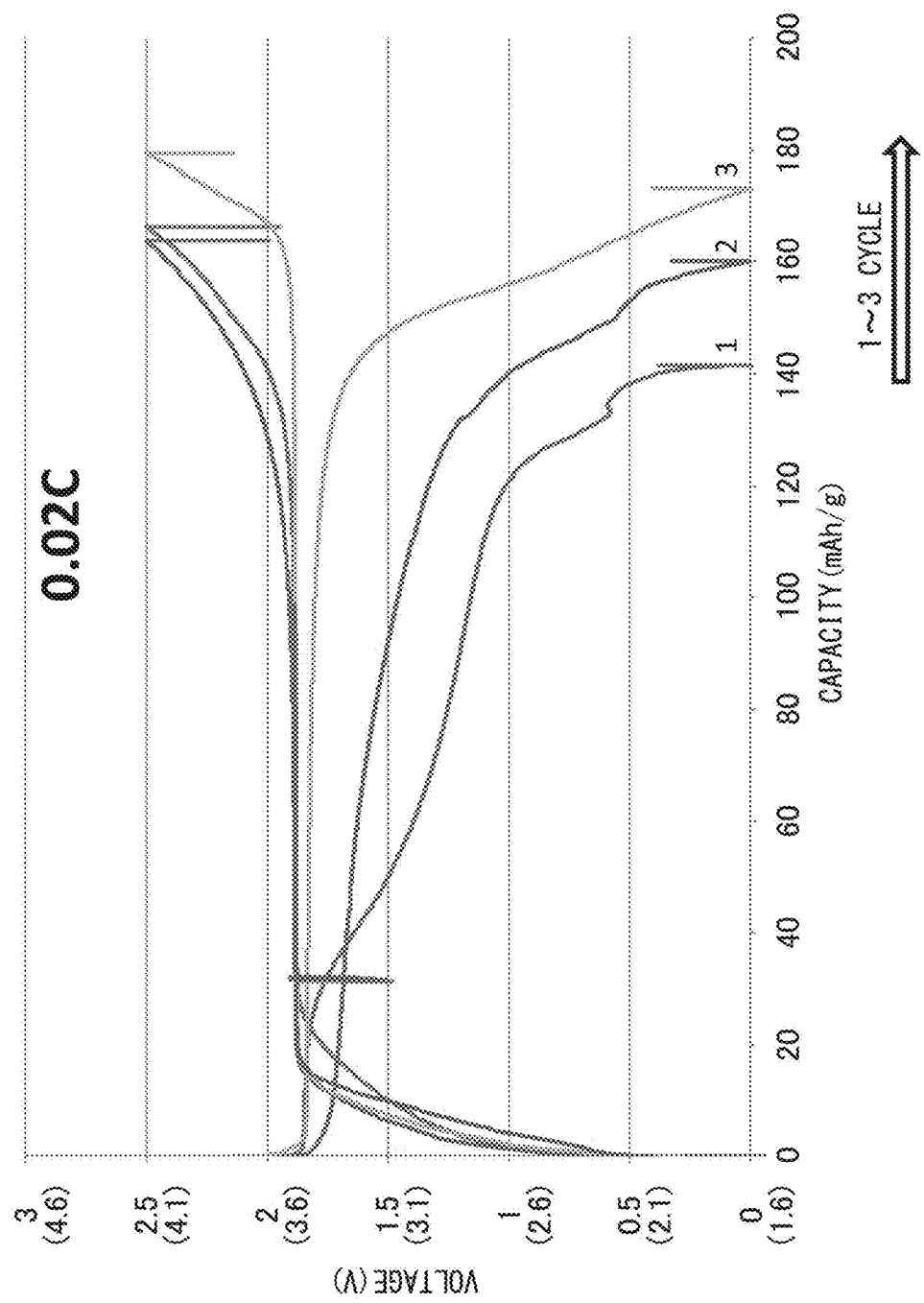
FIG. 9A is a graph representing the relationship between voltage and battery capacity when charge-discharge cycling has been repeated while maintaining the charge-discharge rate at 0.02 C.

Conversely, as shown in FIG. 9A, in Reference Example 29, in which charge-discharge cycling was repeated at a charge discharge rate of 0.02 C, a potential plateau appeared in the vicinity of 2.1 V (vs. Li/Li$^+$) to 2.5 V (vs. Li/Li$^+$) during initial discharge. Subsequently, however, the potential plateau in the vicinity of 2.1 V (vs. Li/Li$^+$) to 2.5 V (vs. Li/Li$^+$) was no longer observed during the second discharge cycle, while a potential plateau appeared at 3.3 V (vs. Li/Li$^+$) to 3.5 V (vs. Li/Li$^+$) in the third cycle. This is thought to be due to the long duration of discharge caused by the low charge-discharge rate, resulting in more reactions between the resistive layer and lithium ions during a single cycle.

(4) Temperature (Reference Examples 30 to 34)

The all-solid-state batteries of Reference Examples 31 to 33 were repeatedly subjected to charge-discharge cycling while maintaining the temperature of the batteries at 42° C., 60° C. and 80° C., respectively. As a result, although battery capacity decreased during the first three to four cycles, as a result of subsequently further repeating charge-discharge cycling up to 20 cycles, all-solid-state batteries were able to be obtained that demonstrated high battery capacity.

In particular, battery capacities that approached the theoretical capacity of LiFePO$_4$ were able to be realized in Reference Example 31 (about 165 mAh/g) and Reference Example 32 (about 175 mAh/g). In addition, final battery capacity in Reference Example 33 was about 110 mAh/g, thereby making it possible to realize high battery capacity, although lower than the theoretical capacity of LiFePO$_4$.

In the case of Reference Examples 31 and 32, in which charge-discharge cycling was repeated while maintaining the temperatures of the all-solid-state batteries at 42° C. and 60° C., respectively, as shown in FIGS. 8B and 8C, although battery capacity gradually decreased during the first three to four cycles, as a result of subsequently repeating charge-discharge cycling, battery capacity gradually increased, eventually stabilizing at about 165 mAh/g to 175 mAh/g after 20 cycles.

As shown in FIGS. 8B and 8C, in Reference Examples 31 and 32, potential plateaus appeared at 2.1 V (vs. Li/Li$^+$) to 2.5 V (vs. Li/Li$^+$) corresponding to the electrical potential of the reaction between iron sulfide and lithium ions during the first three to four discharge cycles. These potential plateaus gradually decreased each time cycling was subsequently repeated, and potential plateaus formed at 3.3 V (vs. Li/Li$^+$) to 3.5 V (vs. Li/Li$^+$) corresponding to the reaction potential of LiFePO$_4$ after 20 cycles.

In Reference Examples 31 and 32, this is thought to be due to the resistive layer composed of iron sulfide formed during initial charging being destroyed by reacting with lithium ions during the first three to four cycles, and as a result of the resistive layer having been separated from the interface between the positive electrode active material and sulfide solid electrolyte due to subsequent charge-discharge cycling, the positive electrode active material was able to adequately react with lithium ions.

Figure 8D:
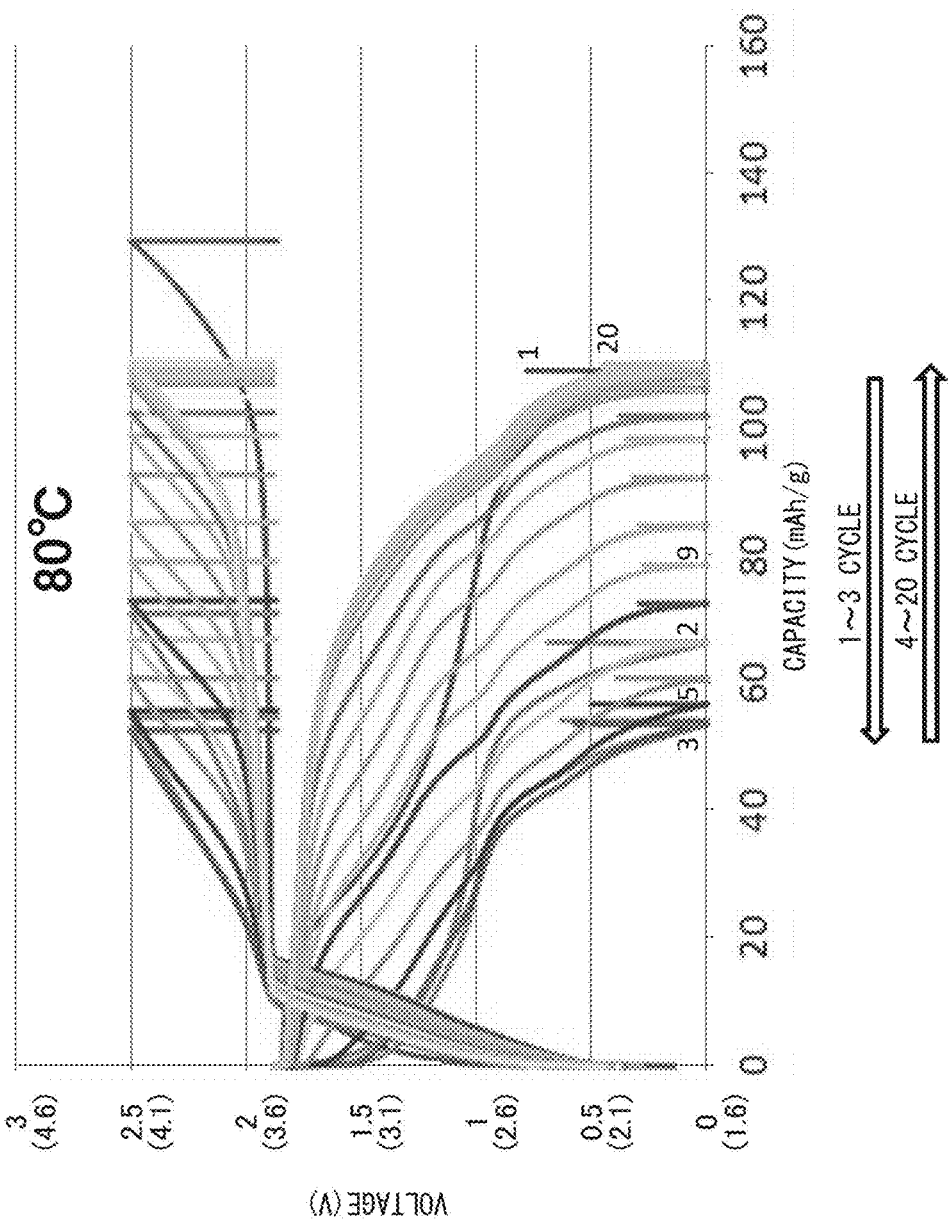
FIG. 8D is a graph representing the relationship between voltage and battery capacity of an all-solid-state battery which has been repeatedly charged and discharged while maintaining the temperature at 80° C.
Figure 8E:
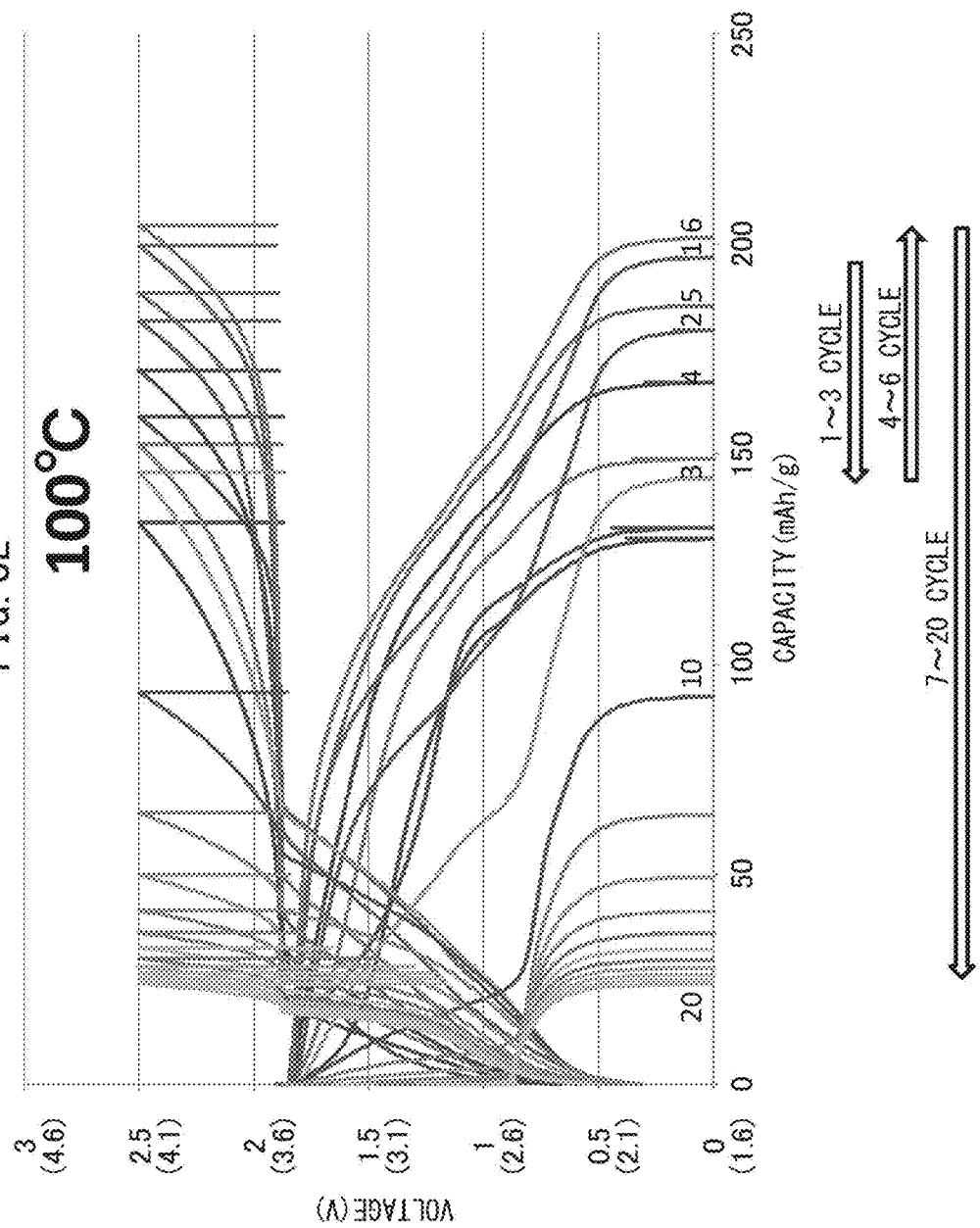
FIG. 8E is a graph representing the relationship between voltage and battery capacity of an all-solid-state battery which has been repeatedly charged and discharged while maintaining the temperature at 100° C.

In addition, when looking at FIG. 8D, when charge-discharge cycling has been repeated while maintaining the temperature of the all-solid-state battery at 80° C. as in Reference Example 33, battery capacity gradually decreased during the first three to four cycles and then subsequently increased and stabilized as a result of repeating charge-discharge cycling in the same manner as when charge-discharge cycling has been repeated while maintaining the temperature of the all-solid-state battery at 42° C. or 60° C. However, when a temperature has been set at 80° C., although battery capacity increased as a result of repeating charge-discharge cycling, the final battery capacity was about 110 mAh/g, which was lower than when charge-discharge cycling have been carried out at 42° C. or 60° C. This is thought to be due to a reduction in battery capacity attributable to deterioration of the positive electrode active material as charge-discharge cycling was repeated due to the high battery temperature.

In addition, when a temperature has been set at 80° C. as shown in FIG. 9D, the discharge curve was determined to decrease gradually (representing a decrease in capacity) at 2.6 V (vs. Li/Li$^+$) to 3.4 V (vs. Li/Li$^+$), and this is presumed to have been caused by the occurrence of side reactions.

On the other hand, in Reference Example 30, in which charge-discharge cycling was repeated while maintaining the temperature of the all-solid-state battery at 25° C., the final battery capacity stabilized at about 138 mAh/g.

In Reference Example 30 as shown in FIG. 9A, a potential plateau at 2.1 V (vs. Li/Li$^+$) to 2.5 V (vs. Li/Li$^+$) was hardly observed at all even after repeating charging and discharging, and battery capacity decreased each time charge-discharge cycling was repeated. However, battery capacity gradually began to rise starting at 14 cycles. Battery capacity had increased to about 138 mAh/g after 66 cycles.

This is thought to be due to hardly any of the resistive layer formed at the interface between the positive electrode active material and sulfide solid electrolyte reacting with lithium ions due to the excessively low temperature of the all-solid-state battery, thereby requiring a larger number of charge-discharge cycles until the resistive layer was destroyed.

In Reference Example 34, in which the temperature of the all-solid-state battery was maintained at 100° C., a potential plateau appeared at 2.1 V (vs. Li/Li$^+$) to 2.5 V (vs. Li/Li$^+$) during the first several cycles as shown in FIG. 9E. In addition, battery capacity increased to about 200 mAh/g when charge-discharge cycling was repeated for 4 to 6 cycles. However, a potential plateau did not appear at 3.3 V (vs. Li/Li$^+$) to 3.5 V (vs. Li/Li$^+$) even if charge-discharge cycling was repeated and battery capacity gradually decreased, eventually decreasing to about 25 mAh/g, which is considerably less than the theoretical capacity of LiFePO$_4$.

In this manner, the temporal increase in battery voltage when charge-discharge cycling has been repeated while maintaining battery temperature at 100° C. indicates that the resistive layer reacts with lithium ions during discharge resulting in a portion of the resistive layer being destroyed. However, since the temperature was excessively high, the positive electrode active material deteriorated and battery capacity was thought to have decreased as charge-discharge cycling was repeated.

In addition, when a temperature has been set at 100° C., as shown in FIG. 9E, the discharge curve was determined to decrease gradually (representing a decrease in capacity) at 2.6 V (vs. Li/Li$^+$) to 3.4 V (vs. Li/Li$^+$), and this is presumed to have been caused by the occurrence of side reactions.

The invention claimed is:

1. An all-solid-state battery system having an all-solid-state battery and a control device, the all-solid-state battery having a positive electrode active material layer, a solid electrolyte layer and a negative electrode active material layer, the control device controlling a lower limit discharge potential of the positive electrode active material layer of the all-solid-state battery; wherein,
the positive electrode active material layer and/or the solid electrolyte layer have a sulfide solid electrolyte,
the positive electrode active material layer has an olivine-type positive electrode active material having a formula Li$_x$M$_y$PO$_z$, wherein, M represents Fe, Mn, Co and Ni, provided that M at least comprises Fe, x is such that 0.5≤x≤1.5, y is such that 0.5≤y≤1.5 and z is such that 2≤z≤7,
the capacity of the negative electrode active material layer is lower than the capacity of the positive electrode active material layer, and
the control device controls the lower limit discharge potential of the positive electrode active material layer during normal use of the all-solid-state battery to within a range of 1.6 V vs. Li/Li$^+$ to 2.1 V vs. Li/Li$^+$.

2. The all-solid-state battery system according to claim 1, wherein a ratio of the capacity of the negative electrode active material layer to the capacity of the positive electrode active material layer is 0.95 or less.

3. The all-solid-state battery system according to claim 1, wherein the olivine-type positive electrode material is LiFePO$_4$.

4. The all-solid-state battery system according to claim 1, wherein the control device controls a charge-discharge rate during normal use of the all-solid-state battery to 1.0 C or less.

5. The all-solid-state battery system according to claim 1, wherein the control device controls an upper limit charging potential of the positive electrode active material layer during normal use of the all-solid-state battery to 3.8 V vs. Li/Li$^+$ to 4.4 V vs. Li/Li$^+$.

6. A method for producing an all-solid-state battery having a positive electrode active material layer, a solid electrolyte layer and a negative electrode active material layer, wherein the positive electrode active material layer and/or the solid electrolyte layer have a sulfide solid electrolyte,
the positive electrode active material layer has an olivine-type positive electrode active material having formula Li$_x$M$_y$PO$_z$, wherein, M represents Fe, Mn, Co and Ni, provided that M at least comprises Fe, x is such that $0.5 \leq x \leq 1.5$, y is such that $0.5 \leq y \leq 1.5$ and z is such that $2 \leq z \leq 7$,
the capacity of the negative electrode active material layer is lower than the capacity of the positive electrode active material layer; and
the method comprises carrying out charge-discharge cycling in which the positive electrode active material layer is discharged to 1.6 V vs. Li/Li$^+$ to 2.1 V vs. Li/Li$^+$ while maintaining a temperature of the all-solid-state battery at 25° C. to 80° C.

7. The all-solid-state battery system according to claim 1, wherein the olivine-type positive electrode active material is Li$_x$Fe$_y$PO$_z$, and wherein, x is such that $0.5 \leq x \leq 1.5$, y is such that $0.5 \leq y \leq 1.5$ and z is such that $2 \leq z \leq 7$.

* * * * *